United States Patent [19]
Fujita et al.

[11] Patent Number: 5,966,690
[45] Date of Patent: Oct. 12, 1999

[54] SPEECH RECOGNITION AND SYNTHESIS SYSTEMS WHICH DISTINGUISH SPEECH PHONEMES FROM NOISE

[75] Inventors: Masahiro Fujita, Saitama; Makoto Inoe; Koji Kageyama, both of Kanagawa; Makoto Akabane, Tokyo, all of Japan

[73] Assignee: Sony Corporation, Tokyo, Japan

[21] Appl. No.: 08/661,396

[22] Filed: Jun. 7, 1996

[30] Foreign Application Priority Data

Jun. 9, 1995 [JP] Japan .................................... 7-142870

[51] Int. Cl.$^6$ ...................................................... G10L 9/14
[52] U.S. Cl. .......................... 704/233; 704/231; 704/258
[58] Field of Search ..................... 395/2.4, 2.46, 395/2.55, 2.6, 2.65, 2.66, 2.67, 2.71, 2.77, 2.72; 704/231, 233, 208, 268

[56] References Cited

U.S. PATENT DOCUMENTS

| | | | |
|---|---|---|---|
| 3,836,717 | 9/1974 | Gagnon .................................... | 704/268 |
| 3,943,295 | 3/1976 | Martin et al. ............................ | 704/231 |
| 4,661,915 | 4/1987 | Ott ........................................ | 395/2.63 |
| 4,707,858 | 11/1987 | Fette ...................................... | 395/2.6 |
| 4,803,729 | 2/1989 | Baker .................................... | 395/2.5 |
| 4,833,714 | 5/1989 | Shimotani et al. ....................... | 381/47 |
| 4,852,181 | 7/1989 | Morito et al. ........................... | 395/2.42 |
| 4,918,735 | 4/1990 | Morito et al. ........................... | 395/2.42 |
| 5,136,653 | 8/1992 | Kumagai et al. ........................ | 381/43 |
| 5,293,448 | 3/1994 | Honda .................................... | 704/208 |
| 5,377,302 | 12/1994 | Tsiang ................................... | 395/2.44 |
| 5,390,278 | 2/1995 | Gupta et al. ............................ | 704/243 |
| 5,692,097 | 11/1997 | Yamada et al. ......................... | 704/231 |

FOREIGN PATENT DOCUMENTS

| | | | |
|---|---|---|---|
| 54-153070 | 12/1979 | Japan ............................ | G04C 21/12 |
| 61-110837 | 5/1986 | Japan ............................ | F24F 11/02 |

*Primary Examiner*—David R. Hudspeth
*Assistant Examiner*—Daniei Abebe
*Attorney, Agent, or Firm*—Limbach & Limbach L.L.P.

[57] ABSTRACT

The language is composed using phonemes which is easy to separate in an environment of noise and disturbing sound.

An acoustic signal comprising phonemes which is easy to separate in an environment of noise and disturbing sound fed to the acoustic signal analyzer is analyzed therein, and from the result of the analysis, the tone name is recognized in the tone name identifier, and after the tone name is recognized as a prescribed sentence, the sentence is fed to the utterance generator. Corresponding to these operations, the utterance generator generates a prescribed time series composed of tone names comprising phonemes which is easy to separate in an environment of noise and disturbing sound, and inputs it to the acoustic signal generator. The acoustic signal generator synthesizes an acoustic signal which corresponds to the time series and outputs the acoustic signal.

26 Claims, 17 Drawing Sheets

FIG. 3
G(w,m)
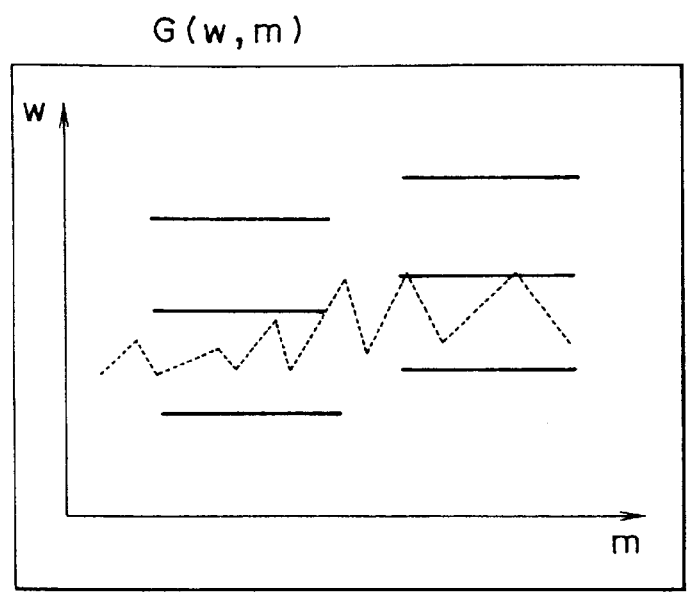
RUNNING AVERAGE IN DIRECTION m
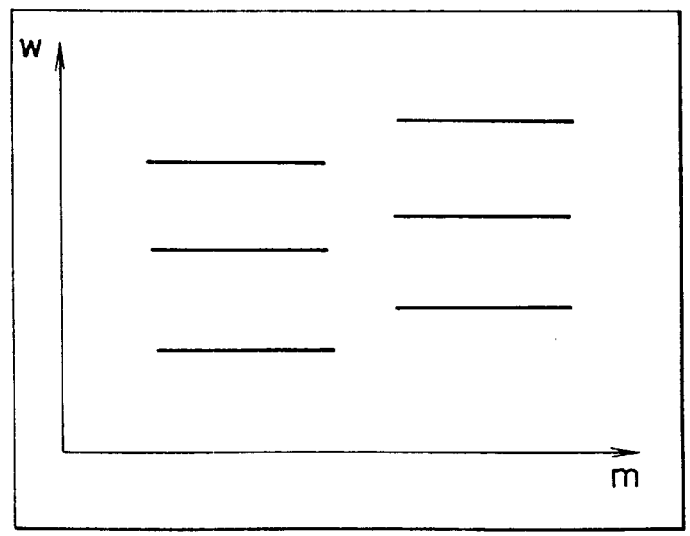
SIGNAL COMPONENT VARYING PERPENDICULARLY TO w-AXIS REMAINS

FIG. 4
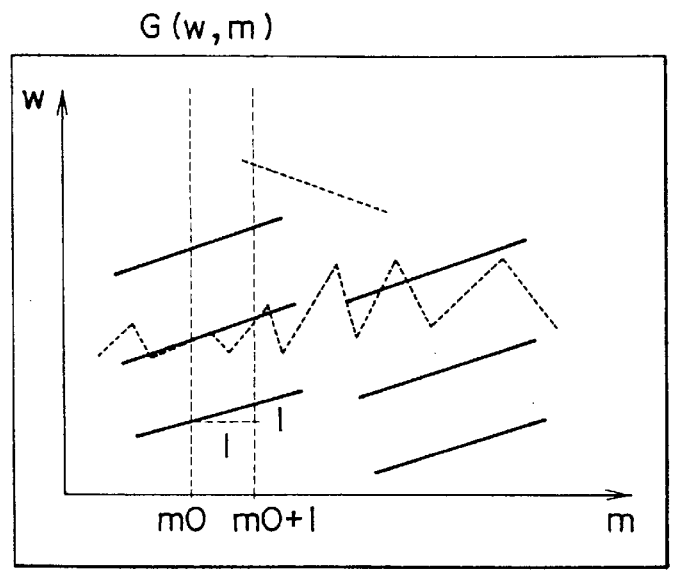
RUNNING AVERAGE IN INCLINATION I
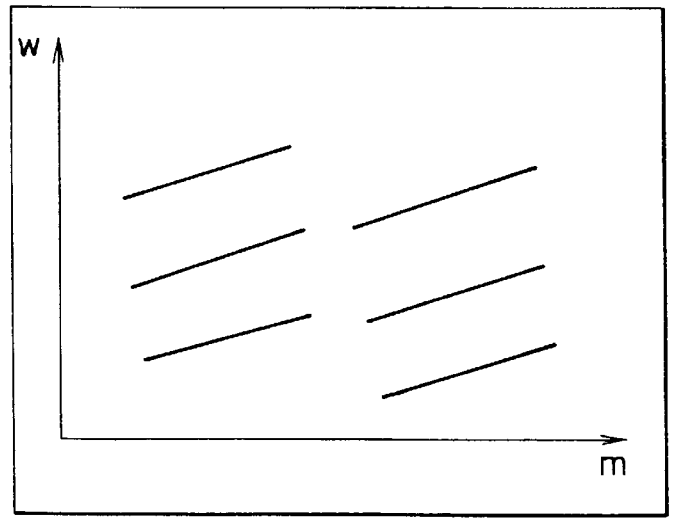
SIGNAL COMPONENT VARYING IN THE INCLINATION I REMAINS

FIG. 5
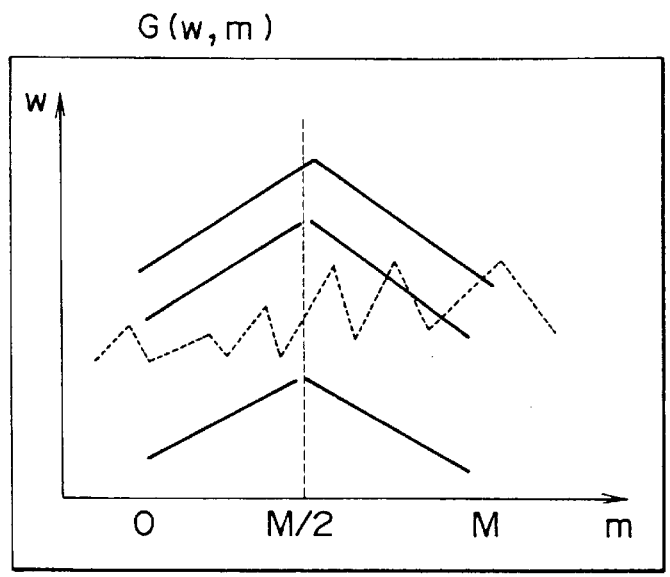
G(w,m)
↓ 0–M/2  RUNNING AVERAGE IN THE INCLINATION 1
↓ M/2–M  RUNNING AVERAGE IN THE INCLINATION (−1)
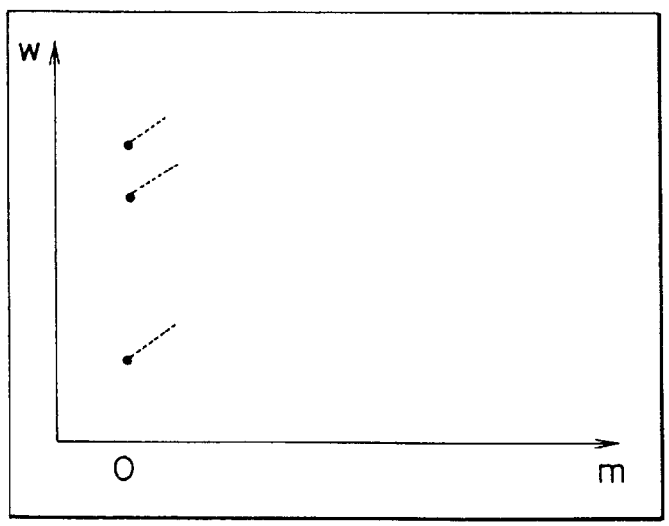
SIGNAL EFFECTIVE ONLY AT m = 0 IS OUTPUTTED

FIG. 9

| | |
|---|---|
| C-E-G | C-Major |
| D-F#-A | D-Major |
| E-G#-B | E-Major |
| F-A-C | F-Major |
| G-B-D | G-Major |
| A-C#-E | A-Major |
| B-D#-F# | B-Major |
| | |
| C-D#-G | C-minor |
| D-F-A | D-minor |
| E-G-B | E-minor |
| F-G#-C | F-minor |
| G-A#-D | G-minor |
| A-C-E | A-minor |
| B-D-F# | B-minor |
| | |
| C-E-G-A# | C7th |
| D-F#-A-C | D7th |
| E-G#-B-D | E7th |
| F-A-C-D# | F7th |
| G-B-D-E | G7th |
| A-C#-E-G | A7th |
| B-D#-F#-A | B7th |

FIG. 12

| SENTENCE \ CONDITION | T0 | T1 | T2 | T3 | T4 | T5 | T6 |
|---|---|---|---|---|---|---|---|
| S1 | T3/T0 | T6 | T5 | T4 | T5 | T0 | T0 |
| S2 | T0/T0 | T5 | T5 | T4 | T5 | T0 | T0 |
| S3 | T0/T0 | T5 | T5 | T4 | T5 | T0 | T0 |

F I G. 13
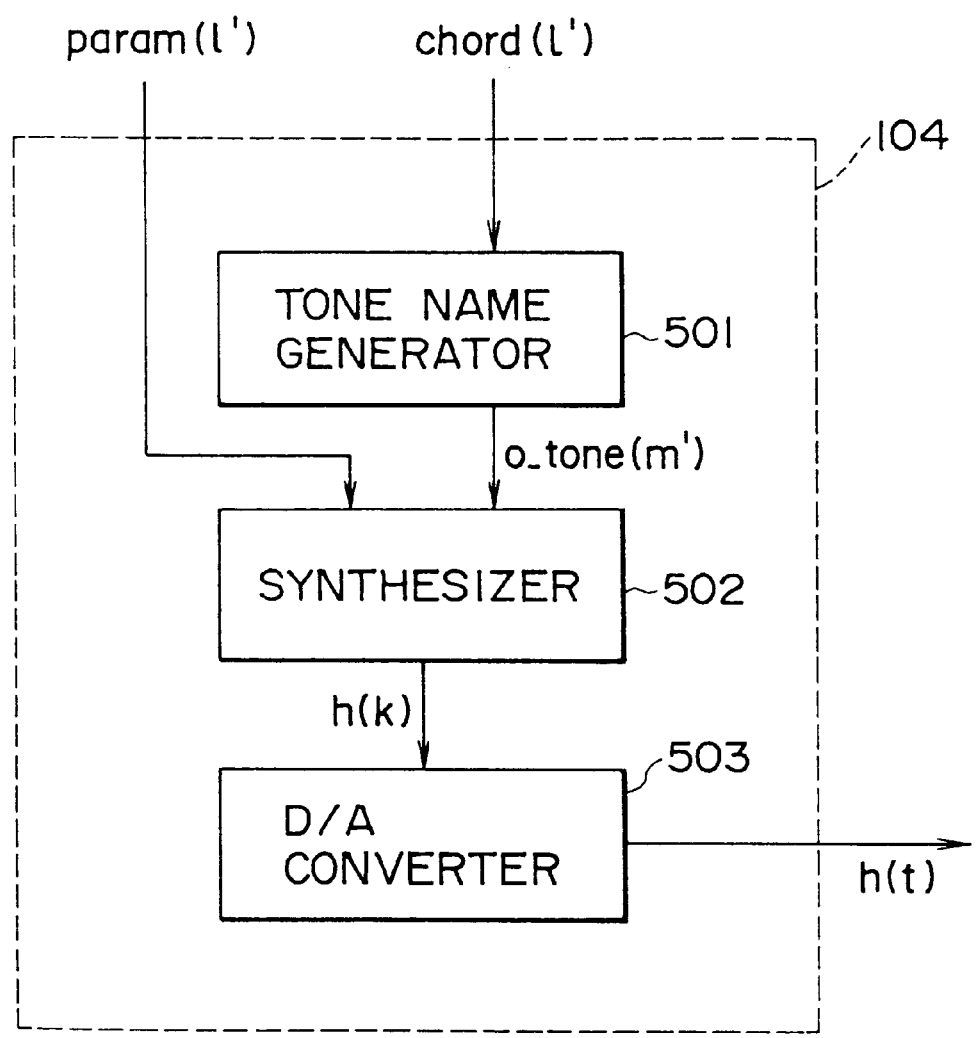

F I G. 15A
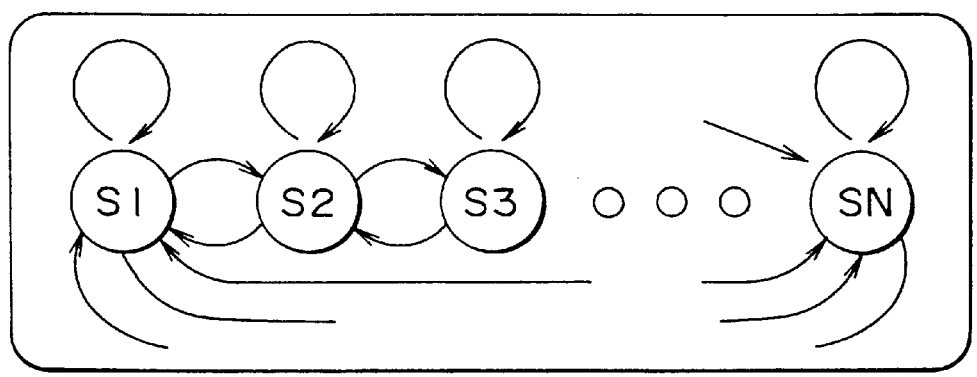
F I G. 15B
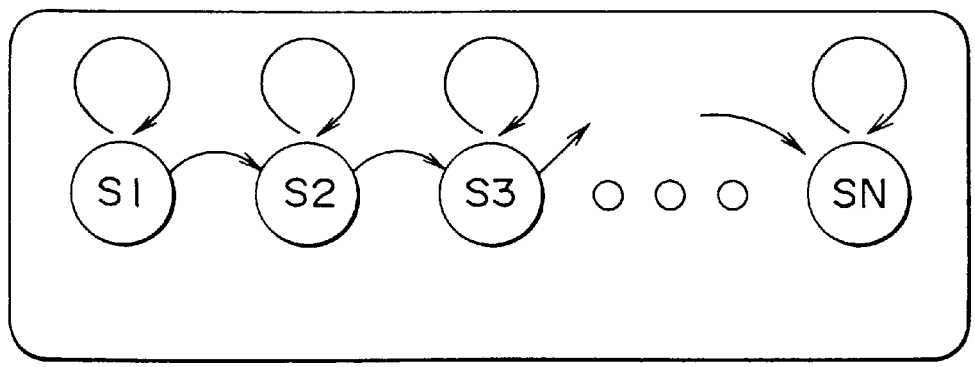

FIG. 18

| WORD / CONDITION | T0 | T1 | T2 | T3 | T4 | T5 | T6 |
|---|---|---|---|---|---|---|---|
| S1 | T3/T0 | T6 | T5 | T4 | T5 | T0 | T0 |
| S2 | T0/T0 | T5 | T5 | T4 | T5 | T0 | T0 |
| S3 | T0/T0 | T5 | T5 | T4 | T5 | T0 | T0 |

SPEECH RECOGNITION AND SYNTHESIS SYSTEMS WHICH DISTINGUISH SPEECH PHONEMES FROM NOISE

BACKGROUND OF THE INVENTION

1. Field of the Invention

This invention relates to a speech recognition system, speech synthesis system, and a speech recognition and synthesis system, and more particularly relates to speech recognition system, speech synthesis system, and speech recognition synthesis system suitable for recognition and synthesis of acoustic signal in the audible band range.

2. Description of the Related Art

For conversation between one or more of apparatus and one or more of persons, conventionally a system is structured so as the apparatus recognizes a natural language (such as Japanese and English) by combining speech recognition and speech synthesis, convert words or sentences to speech signal, and answer in a natural language. However, conventional speech recognition systems are affected by noise and disturbing sound, and the correct recognition rate is low. To solve this problem, some techniques have been proposed as described herein under.

One is a technique to avoid noise and disturbing sound by modifying a microphone. For example, in a technique a directional microphone is directed to a sound source to reduce noise. The technique disclosed in Japanese Patent Laid-Open No. Sho 59-012500 (1984) may be referred as the example.

Otherwise, in another technique, noise and disturbing sound are estimated by signal processing to subtract the estimated noise and disturbing sound from the signal. For example, in the pre-processing such as frequency conversion, spectrum component of background noise is subtracted to mitigate the affection of the background noise, this technique is referred as spectrum subtraction. The technique disclosed in Japanese Patent Laid-Open No. Sho 57-212496 (1982) may be referred as the example. Further otherwise, in another technique, for the case in which noise is collected using adaptive signal processing, the noise is filtered to remove the noise from the mixed signal of speech and noise.

In still another technique, disturbing sound and speech to be recognized are mapped using a certain map in a space where the position of the disturbing sound is far from that of the speech, and the speech is recognized. For example, "A noise removing device using a neuro-network model" disclosed in Japanese Patent Laid-Open No. Hei 2-15718 (1990) describes a device in which a neuro-network having a multilayered structure learns the map with input of mixed speech and noise and output of speech without noise to remove the noise. Japanese Patent Laid-Open No. Sho 60-75898 (1985) discloses a technique that solely harmonic component of speech pitch is detected to prevent the degradation of word recognition performance.

From the view point of the freedom in designing a speech recognizer, these techniques are categorized to a technique for removing disturbing sound by providing a suitable method for sound collection in an service environment, a technique for removing disturbing sound by suitable signal processing, and a technique for separating disturbing sound from speech by selecting suitable map.

On the other hand, as method to transmit a message from an apparatus to a person, a method which involves a natural language has been disclosed conventionally. As a method which does not involves a natural language, Japanese Patent Laid-Open No. Sho 54-153070 (1979) discloses an apparatus in which the time of a clock is informed by one-to-one corresponding tones such as "do, re, mi, fa, . . . " instead of a natural language to numerals. This apparatus involves transmission of information from an apparatus which does not speak a natural language to a person, the transmission from the apparatus to a person does not involve a natural language, therefore, this is not a conversational system.

Japanese Patent Laid-Open No. Sho 61-110837 (1986) discloses an apparatus remote controllable by clapping hand or whistling, this apparatus is an example of information transmission means from a person to an apparatus. The claim 1 of this invention describes "A method for controlling an air conditioner which is remote controllable to control ON-OFF switching of power supply and other setting remotely, wherein an air conditioner is switched to start-up or to shut-down by inputting arbitrary numbers of acoustic wave in a certain time period intermittently". The description of background in the invention points out the disadvantage of a wireless remote controller that a controller can be dropped or lost, however, the invention does not involves the phoneme design associated with measures against noise and disturbing sound. Also this technique involves only one-way information transmission from a person to an apparatus, therefore, this is not a conversational system.

As described herein above, from the view point of the freedom in designing, these conventional speech recognition apparatus are optimized in designing based on the view point of;

(1) removal of disturbing sound by providing a suitable sound collection, (2) removal of disturbing sound by suitable signal processing, and (3) separation of speech and disturbing sound by selecting a suitable map.

As described herein above, in the field of speech recognition and speech synthesis using a natural language, conversational systems are disclosed, however, natural conversation using a natural language is still technically difficult now. Particularly, the recognition is very difficult in usual institutional and home environments because of disturbing sound and noise.

Synthesizers and recognizers not using a natural language have been disclosed independently, these systems are not introduced to improve disturbing sound and noise reduction performance, therefore, a conversational system can not be suggested from these systems.

In view of the above mentioned situation, the present invention has been accomplished to realize a conversational system which is capable of recognizing the information transmission between one or more of apparatus and one or more of persons provided with measures against disturbing sound and noise.

SUMMARY OF THE INVENTION

A speech recognition system as claimed in claim 1 for recognizing speech in a noisy and disturbing sound environment provided with an analyzing means for analyzing phoneme or sound composed of a time series of phonemes having acoustic characteristics of noise and disturbing sound separation.

When the analytical results by the analyzing means are arranged in an analysis space having a prescribed dimension and in a prescribed order, the position of feature points resultant from the analysis are allowed to move according to a prescribed rule in the time series analysis space composed of the analysis space and time axes.

The feature point is the point selected from maximum or minimum value of the analytical results in the analysis space.

The feature point moves in the direction having a prescribed inclination to the time axis for a prescribed time period in the time series analysis space.

The feature point can move in the parallel direction to the time axis for a prescribed time period in the time series analysis space.

The pitch of a sound does not change beyond a prescribed range for a prescribed time period.

The phoneme may be a vowel.

The analysis means is a linear convolution operation.

A recognition means including Hidden Markov Model is provided, and a sound is recognized by the recognition means corresponding to the analytical result from the analysis means.

The speech synthesis system as claimed in the claim 10 is a speech synthesis system for synthesizing speech in a noisy and disturbing sound environment provided with speech synthesis means for synthesizing phoneme or sound composed of a time series of phonemes having acoustic characteristics of easy noise and disturbing sound separation.

When the analytical results of sound by a prescribed analyzing means are arranged in analysis space having a prescribed dimension and in a prescribed order, the position of feature points resultant from the analysis are allowed to move according to a prescribed rule in the time series analysis space composed of the analysis space and time axes.

The feature point is the point selected from maximum or minimum value of the analytical results in the analysis space.

The feature point moves in the direction having a prescribed inclination to the time axis for a prescribed time period in the time series analysis space.

The feature point can move in the parallel direction to the time axis for a prescribed time period in the time series analysis space.

The pitch of a sound does not change beyond a prescribed range for a prescribed time period.

The phoneme may be a vowel.

A speech recognition synthesis system as claimed in the claim 17 is a speech recognition synthesis system provided with an analysis means for analyzing a phoneme or sound composed of a time series of phonemes having acoustic characteristics of easy noise and disturbing sound separation and a synthesis means for synthesizing a phoneme or sound composed of a time series of phonemes having acoustic characteristics of easy noise and disturbing sound separation.

When the analytical results of a sound by the analyzing means are arranged in analysis space having a prescribed dimension and in a prescribed order, the position of feature points resultant from the analysis are allowed to move according to a prescribed rule in the time series analysis space composed of the analysis space and time axes.

The feature point is the point selected from maximum or minimum value of the analytical results in the analysis space.

The feature point moves in the direction having an prescribed inclination to the time axis for a prescribed time period in the time series analysis space.

The feature point can move in the parallel direction to the time axis for a prescribed time period in the time series analysis space.

The pitch of a sound does not change beyond a prescribed range for a prescribed time period.

The phoneme may be a vowel.

The analysis means is a linear convolution operation.

A recognition means including Hidden Markov Model is provided, and a sound is recognized by the recognition means corresponding to the analytical result from the analysis means.

In the speech recognition system as claimed in the claim 1, a phoneme or a sound composed of a time series of phonemes having acoustic characteristics of easy noise and disturbing sound separation is analyzed by the analytical means. Therefore, a target sound is detected or recognized without affection of disturbing sound or noise.

In the speech synthesis system as claimed in the claim 10, a phoneme or a sound composed of a time series of phonemes having acoustic characteristics of easy noise and disturbing sound separation is synthesized by the synthesis means. Therefore, a target sound is synthesized without affection of disturbing sound or noise.

In the speech recognition synthesis system as claimed in the claim 17, a phoneme or sound composed of a time series phonemes having acoustic characteristics of easy noise and disturbing sound separation is analyzed and a phoneme or sound composed of a time series phonemes having acoustic characteristics of easy noise and disturbing sound separation is synthesized. Therefore, a target sound is analyzed without affection of disturbing sound or noise and a target sound is synthesized without affection of disturbing sound or noise.

BRIEF DESCRIPTION OF THE DRAWINGS

FIG. 3 is a graph for describing feature extraction when the same pitch frequency continues for a certain degree.

FIG. 4 is a graph for describing feature extraction when a pitch frequency changes linearly with a certain inclination.

FIG. 5 is a graph for describing feature extraction when a pitch frequency changes depending on the time m.

FIG. 9 is a figure for describing the definition of chord and a musical scale.

FIG. 12 is a figure for illustrating an utterance table.

FIG. 13 is a block diagram for illustrating a structural example of an acoustic signal synthesizer 104.

FIGS. 15A and 15B are a set of figures for illustrating a model of HMM.

FIG. 18 is a figure for illustrating an utterance table.

DETAILED DESCRIPTION OF THE PREFERRED EMBODIMENTS

Figure 1:
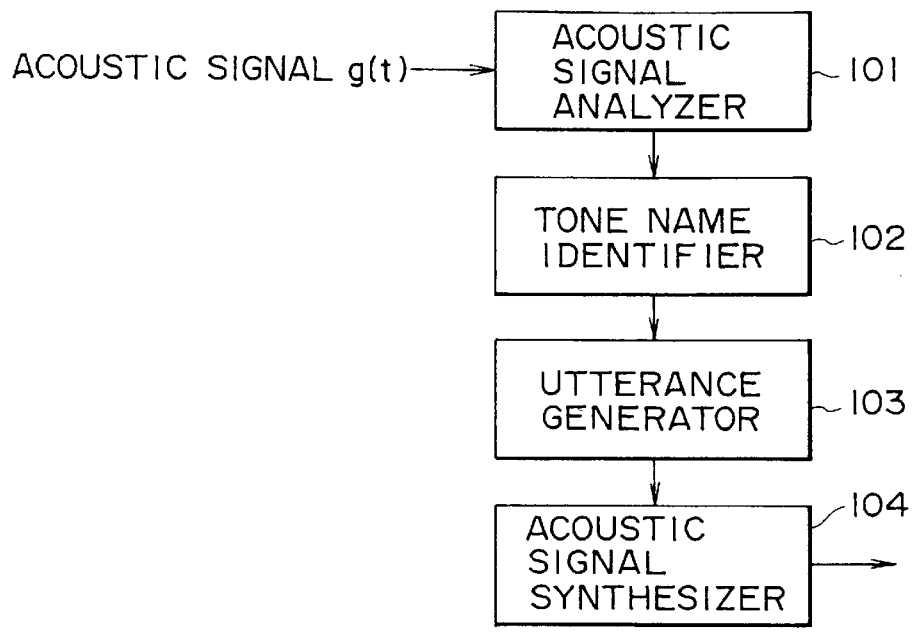
FIG. 1 is a block diagram for illustrating one embodiment of an interactive system in accordance with the present invention.

FIG. 1 is a block diagram for illustrating the whole structure of an embodiment of an interactive system in accordance with the present invention. In this embodiment, an acoustic signal analyzer 101 (the analytical means) analyzes input acoustic signal g(t) which is treated as a function of the time "t". A tone name identifier 102 (the recognition means) analyzes more in detail the output from the acoustic signal analyzer 101 and identifies the tone name. An utterance generator 103 (the synthesis means) generates a certain message based on the recognition result of the tone name identifier using the tone name similarly. An acoustic signal synthesizer 104 converts the message generated by the utterance generator 103 to an acoustic signal.

Next, the operation of the system is described. An acoustic signal g(t) detected by, for example, a microphone is fed to the acoustic signal analyzer 101, in the acoustic signal analyzer 101 the acoustic signal g(t) is subjected to frequency analysis, then data which corresponds to the frequency structure are fed to the tone name identifier 102. In the tone name identifier 102, a tone name such as do, re, mi, . . . in a musical scale is detected based on the frequency structure of the acoustic signal g(t), and a chord is identified based on the time series such as an arpeggio expression of a chord in musical scale, and the chord is recognized as a word or sentence which corresponds to the chord.

In the utterance generator 103, a time series which is structured of tone name similarly is generated depending on the resultant identification by the tone name identifier 102 and the internal condition of the utterance generator, and the time series is fed to the acoustic signal synthesizer 104. In the acoustic signal synthesizer 104, the result form the utterance generator 103 is converted to an acoustic signal, and outputted as a signal for operating a device such as speaker.

Herein the tone name refers do, re, mi, . . . in the musical scale, a different expression such as C, D, E, . . . is also used. The chord refers harmony, in this embodiment the chord refers to a time series of sound which is called as broken chords or arpeggio, that constituent sounds of a chord, are outputted successively with short time lag.

Figure 2:
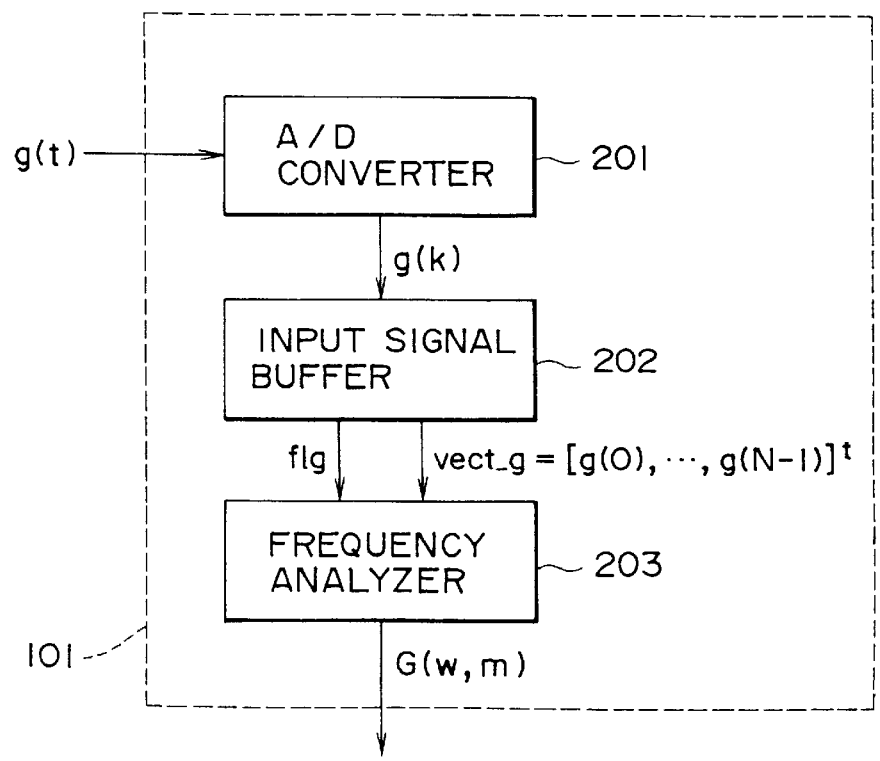
FIG. 2 is a block diagram for illustrating a structural example of an acoustic signal analyzer 101.

The blocks will be described individually hereinafter. FIG. 2 is a block diagram for illustrating the detail of the acoustic signal analyzer 101. A A/D converter 201 is structured so as to convert the analog signal g(t) to a digital signal g(k) and output. An input signal buffer 202 stores the input digital signal g(k). A frequency analyzer 203 operates Fourier transformation on the input signal to output transformed result.

For example, when an analog input signal g(t) is fed to the A/D converter 201, in the A/D converter 201, the analog signal is converted to a digital signal g(k) and outputted. Wherein, k=0, 1, 2, . . . is an index of an sampling series.

The A/D converter 201 comprises, for example, a low pass filter (LPF) for preventing aliasing noise and an A/D converter having a sampling frequency of 16 bits 8 kHz. The digital signal g(k) is stored in the input signal buffer 202 in the form of 512 samples (g(0), g(1), . . . , g(N−1), representing as N=512) as a single block, the block is Fourier-transformed in the frequency analyzer 203, and frequency analysis is operated. The signal (flg) outputted from the input signal buffer 202 is a signal for indicating that 512 data are stored, the frequency analyzer 203 inputs a single block signal (vect_g) composed of 512 data from the input signal buffer 202. This data are represented by the following equation 1.

$$vect\_g(m) = [g(512 \cdot m+0), g(512 \cdot m+1), \ldots, g(512 \cdot m+511)]^t \quad \text{(Equation 1)}$$

In the equation 1, ^t represents a transported matrix. In other words, vect_g represents a matrix with 512 rows single column or column vector. Fourier transformation in the frequency analyzer 203 is a processing represented by the following equation 2.

$$G(w, m) = vect\_g^t(m) \cdot vect\_kernel(w)$$

In the equations 1 and 2, the variable m is an index for treating the result of frequency analysis as a time series, namely, speech frame number.

vect_kernel(w) in the equation 2 is a vector represented by the following equation 3.

$$vect\_kernel(w) = [\exp(-j2\pi w \times 0/512), \quad \text{(Equation 3)}$$
$$\exp(-j2\pi w \times 1/512), \ldots, \exp(-j2\pi w 511/512)]$$

In the equation 3, j represents an imaginary number, and π represents the circular constant. The variable w=0, 1, 2, . . . , 511 are indexes of the frequency. An actual frequency is represented by fs×w/N (N represents the length of the block, in this example N=512) corresponding to the sampling frequency fs. Usually, the signal vector vect_g is multiplied with what is called window function, then, the equation 3 is converted, but, in this embodiment for simplification, a square window function is assumed to omit the multiplication.

In detail, because the continuation of Fourier transformation output with the same pitch or the same index for a certain time period is utilized as the feature of a sound to be detected in this embodiment, G(w, m) of the equation 2 is subjected to Low Pass Filter for the variable m for every variables w. Actually, Low Pass Filter is replaced by running average. In other words, [G(w, m)+G(w, m+1)+, . . . ,+G(w, m+MM−1)]/MM is outputted. In this embodiment, the variable MM=3. For simplification, this value [G(w, m)+G(w, m+1)+, . . . , +G(w, m+MM−1)]/MM is represented simply by G(w, m)

Generally saying, the remarkable feature of an input signal of the present invention is described herein under.

The result of frequency analysis of an acoustic signal is represented by G(w, m), then for example, first, the position of the maximum point in w-axis direction that is information when pitch frequency is determined is assigned as the feature value. These feature values are designated as G(w_1, m), G(w_2, m), G(w_P, m) at a certain time m. The motion which moves according to a certain rule is defined as the motion in accordance with the following conversion rule.

GM(m): G(w_1, m)→G((w_1)', m+1)

GM(m): G(w_2, m)→G((w_2)', m+1)

GM(m): G(w p, m)→G((w_p)', m+1)

.
.
.

GM(m): G(w p, m)→G((w_P)', m+1)

The action element GM(m) is active to an arbitrary frequency other than the feature point, and generally represented by GM(w, m): G(w, m)→G(w', m+1), wherein w and w' represent arbitrary frequencies. In this embodiment, the maximum point is assigned as the feature point, but, differently another point may be assigned as the feature point.

To MM samples of the input G(w, m) including signals which changes according to the rule, the actions GM(w, 0), GM(w, 1), . . . , G(w, MM−1) are applied with filtration of Low Pass Filter, thereby, the signal component which does not behave according to the rule is suppressed.

This action is represented by the following equation.

$$VG'(m)=MGM(m)*VG(m)$$

wherein vector VG(m)=[G(0, m), G(1, m), . . . , G(W−1, m)]↑t represents G(w, m), and diagonal matrix MGM(m) represents GM(w, m), MGM (i, i) element=GM(i, m) and non-diagonal element=0.

VG' is a signal which is converted according to the rule GM at the time m. Therefore, if the signal included in VG' behaves according to the rule, then VG(m+1)=VG'(m). Therefore, when the signal is subjected simply to running average instead of Low Pass Filter, the addition is continued as VG'(m+1)=MGM(m+1)*[VG(m+1)+VG'(m)] (m=0, 1, . . . , M−1) to add by the suitable number of MM, and the resultant sum is divided by MM, thereby, signals which changes according to the rule are synchronously added. The equation of running average is shown herein under.

Here, VG'(0) is a zero vector. VG"(m)=[VG'(m)+VG'(m+1)+. . . , +VG'(m+MM−1) ]/MM The feature point of VG"(m) obtained as described herein above is detected, thereby, the feature is detected for only good signals in the condition that signals which do not behave according to the rule is suppressed.

In the embodiment, the continuation of the same pitch frequency for a certain time period is defined as the rule, in this case, the rule is represented by GM(w, m): G(w, m)→G(w, m+1). In other words, the conversion is only the shift on the frequency axis.

Therefore, VG'(m+1)=MFM(m+1)*[VG(m+1)+VG(m)] is a running average in the frequency direction of G(w, m). FIG. 3 describes the running average. FIG. 4 describes the running average involving linear change with a certain inclination.

In this case, GM(w, m): G(w, m)→G(w+1, m+1). Though both FIG. 3 and FIG. 4 involve the function GM(w, m) which does not depend on the time m, FIG. 5 involves that which depends on the time m. In FIGS. 3 to 5, dotted lines represent separated noise.

In FIG. 5, the function GM(w, m) is represented as described herein under.

$$GM(w, m):G(w, m)→G(w+1), m+1), 0<=m<M/2$$

$$GM(w, m):G(w, m)→G(w-1), m+1), M/2<=m<M$$

When, the resultant running average outputs a signal which is effective only at m=0, other signals are attenuated by the filter, because GM(w, m) depends on m. In such a case, the result at m=0 is feature-extracted and the feature point such as pitch frequency is determined.

The description herein above is a description for the case that the target signal which moves according to a certain rule represented by the action element of GM(w, m) exists in the time series analysis space (in the embodiment 1, the space at G(w, m)) when the input signal is analyzed. In this case, the signal is subjected to filtration in view of the rule in the analysis space (GM(w, m)) before the feature extraction (in the embodiment 1, pitch frequency detection) (in other words, running average while conversion by GM(m, m)).

In the embodiment 2 described hereinafter, vowels are assigned as the target signal, however, in this embodiment 1, the rule is applied in the space of the signal from which space the feature is extracted. The rule, which the target signal has, extends unstably in the time direction (in detail, the length of the signal changes dynamically on the time axis such as aaaa . . . i and ai), to cope with this problem, the technique of HMM is used. In the case of HMM, for HMM of words composed of only vowels, the probability of every such words is calculated. Therefore, the rule of motion (change) in the feature space is obtained in the model of HMM by learning in view of the extension on the time axis for each word.

Figure 6:
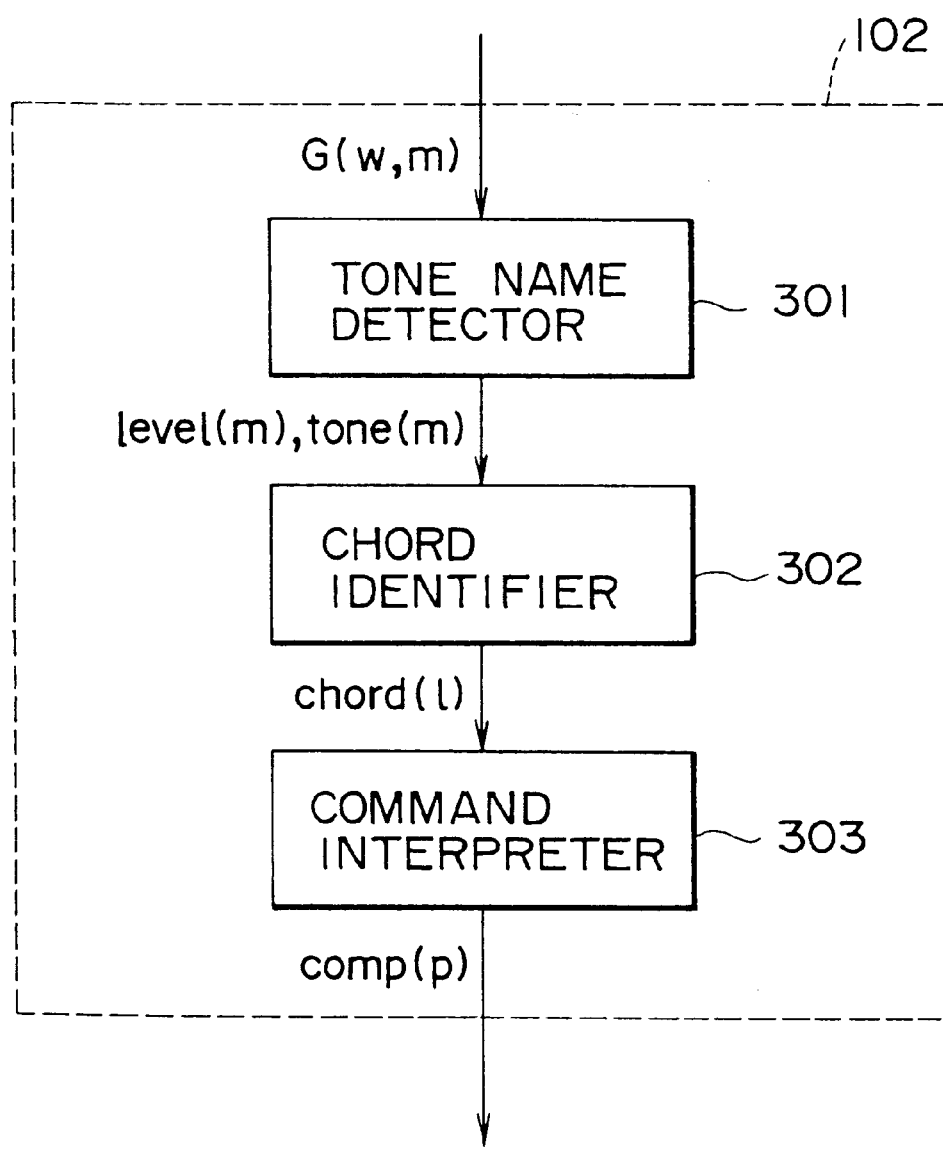
FIG. 6 is a block diagram for illustrating a structural example of a tone name identifier 102 shown in FIG. 1.

Next, details of the tone name identifier 102 in FIG. 1 is shown in FIG. 6. The tone identifier 102 comprises sections for three different processing. The first is a tone name detector 301 for detecting the tone name (pitch name) and the level of the tone from an input signal G(w, m), the second is a chord identifier 302 for identifying a music chord (chord(l)) as a time series from the tone (m) the name of which tone is detected, wherein l=0, 1, 2, . . . are indexes when the chord is identified as a time series. The third is a command interpreter 303 for command-interpreting the chord (1) as a time series and for outputting the input sentence (comp (p)) to the system.

Next, operations of each section are described.

First, operations of the tone name detector 301 are described. The tone name detector 301 detects an equivalent to the name in the musical scale. Actually, the tone name is expressed using index of Fourier transformation alternatively. G(w, m) has the frequency resolution Δf given by the equation 4 because of the sampling frequency of 8000 Hz and 512 points of use for Fourier transformation.

$$Δf=8000/512=15.625 \text{ (Hz)} \qquad \text{(Equation 4)}$$

In other words, w=0, 1, 2,.... of G(w, m) corresponds to Δf×w as frequency value.

On the other hand, to the frequency of sol-fa tones in the musical scale (do, re, mi, fa, sol, la, ti) and tones which are different by a semitone from the sol-fa tones, frequencies which are obtained by dividing equally the logarithmic frequency of an octave by 12 are assigned referring the frequency of la tone of the reference octave as 440 Hz. For simplification, for the case in which do tone of f_do_ref= 130.81 Hz is assigned as the reference frequency, the equation 5 is shown herein under.

$$f(i, oct)=f\_do\_ref×2(i/12)×2(oct) \qquad \text{(Equation 5)}$$

In the equation 5, variables i=0, 1, 2, . . . , 11 are indexes of frequency arrangement of tones on an octave do, do#, re, re#, . . . , ti, and variables oct=. . . −1, 0, 1, 2, . . . are indexes of octave with zero at the same octave as that of f_do_ref.

In this embodiment, it is assumed that effective octaves are not identified beyond the frequency range from the sampling frequency to 4000 Hz, and based on the frequency resolution $\Delta f=15.624$ Hz, oct=0 at which frequencies of two adjacent tones can be easily identified (f_do_ref=f(0, 0) is assumed as the minimum frequency).

In other words, variables oct=0, 1, 2, 3, and 4.

Figure 7:
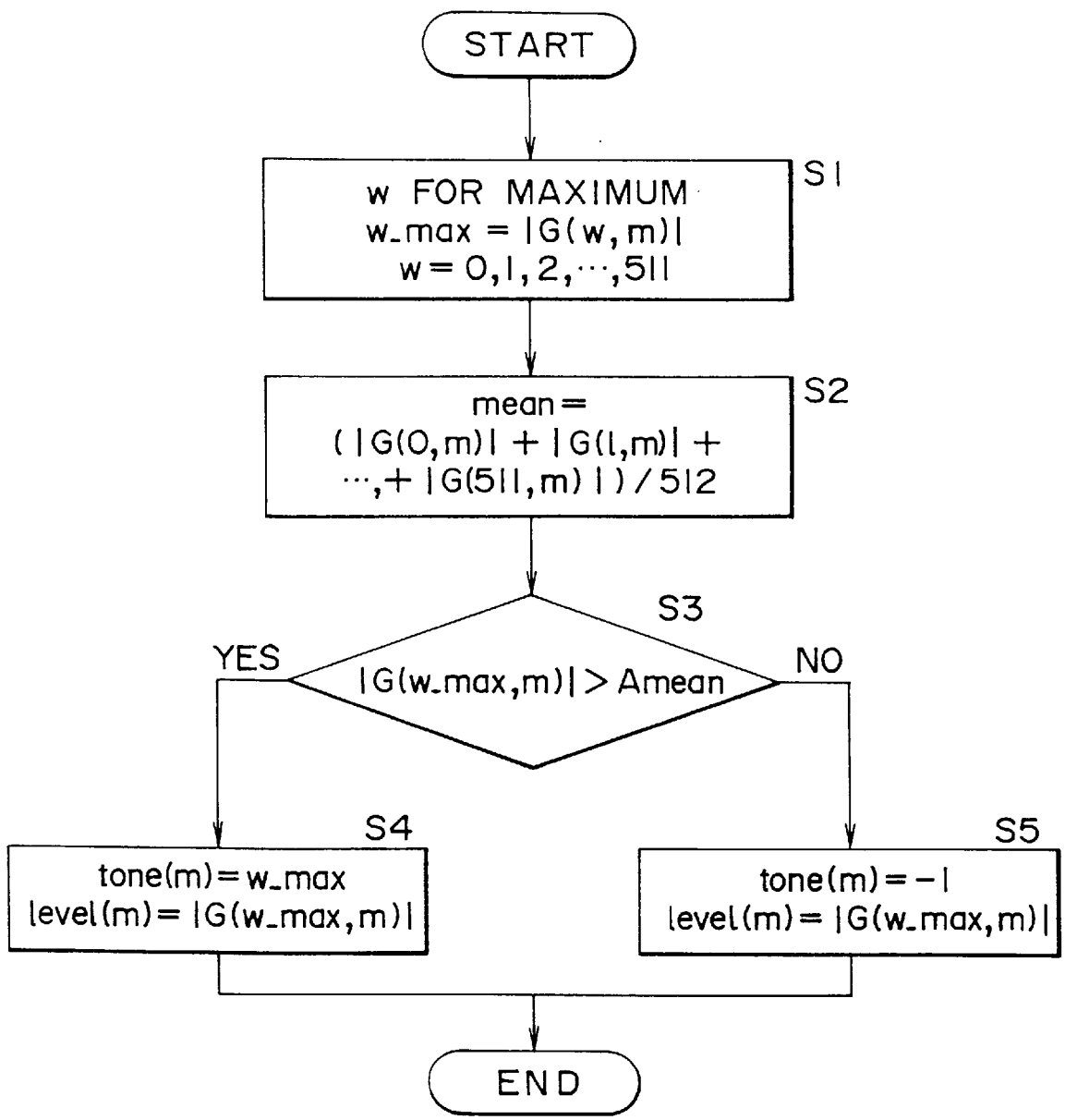
FIG. 7 is a flow chart for illustrating a processing example of a tone name identifier 102 shown in FIG. 1.

Processing procedures of the tone name detector 301 are shown in the flow chart of FIG. 7. In the step S1, the tone detector 301 detects the maximum value of the result G(w, m) from Fourier transformation. w of the index of frequency at the maximum is designated as w=w_max.

Next, the processing proceeds to the step S2, averaging of the absolute value of the transformed result G(w, m) mean= (|G(0, m)|+|G(1, m)|+. . . +|G(511, m)|)512 is operated in the step S2.

Next, the step S3 judges whether the value obtained by dividing the absolute value of the maximum of Fourier transformed result |G(w_max, m)| by the average mean of the transformed result |G(w, m)| is a certain multiple A or larger or smaller than the multiple A. In this embodiment, for example, the multiple A=3 is assumed. When the value obtained by dividing the absolute value of the maximum of Fourier transformed result |G(w_max, m)| by the average mean of the transformed result |G(w, m)| is judged to be a value equal to the multiple A or larger, the process proceeds to the step S4, and tone (m)=w_max is operated. In addition, the definition that the level of the tone, level (m)=|G(w_max, m)| is operated.

On the other hand, when the value obtained by dividing the absolute value of the maximum of Fourier transformed result |G(w_max, m)| by the average mean of the transformed result |G(w, m)| is judged to be a value smaller than the multiple A, the process proceeds to the step S5, the invalidation as tone (m)=−1 is operated. In addition, the definition that the level of the tone, level (m)=|G(w_max, m)| is operated.

It should be noted that the tone (m) is an index of Fourier transformation itself. In detail, $\Delta f \times$tone (m) represents the actual frequency, and this frequency should be converted to a tone name in the musical scale. The conversion is operated by the next chord identifier. As described herein above, the definition that the level of the tone (m)=|G(w_max, m)|is operated, and a silence is detected in the chord identifier 302 described herein under.

Figure 8:
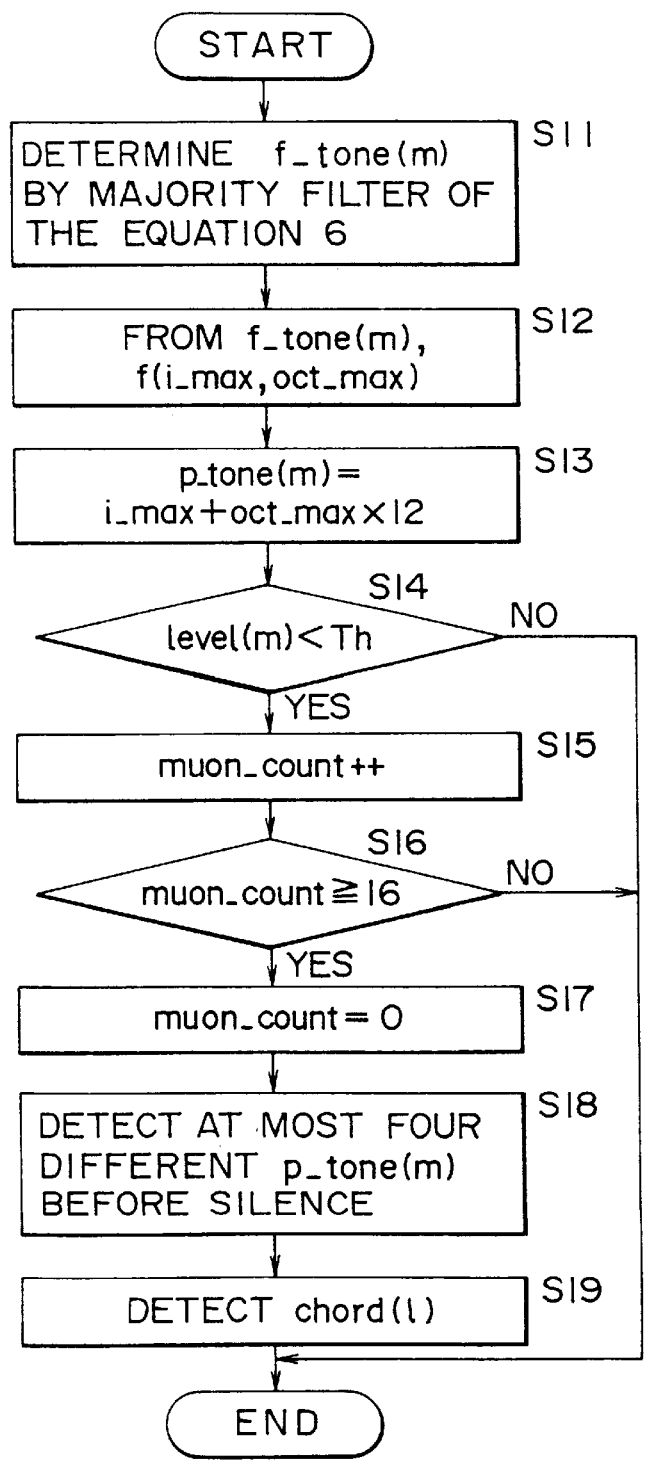
FIG. 8 is a flow chart for illustrating a processing example in a chord identifier 302.

Next, processing procedures (processing in a single frame) in the chord identifier 302 is described referring to the flow chart in FIG. 8. In the step S11, tone (m) is processed by the majority filter to reduce the affection of erroneous detection due to fluctuation and noise of tone (m), and then f_tone (m) is obtained. In the majority filter, the output tone (m) from the tone name detector 301 is treated as a time series data. m=0, 1, 2, . . . of 512 sample strings are included in a single block, therefore, assuming the sampling frequency of 8000 Hz, the time series data comprises 64 msec time period (=⅛₀₀₀×512). First, the time series data are subjected to the filtering in the time direction to reduce the affection of erroneous detection due to fluctuation and noise. In this embodiment, the time series data are subjected to the ten data majority filter. This processing is defined as the equation 6 described herein under.

$$f\_tone\ (m)=tone\ (m),\ tone\ (m+1),\ldots,tone\ (m+9) \quad \text{(Equation 6)}$$

wherein the tone having the largest number of samples is selected.

In the operation described herein above, a tone not having at least four successive straight same tone names is invalidated. Simultaneously, the silence is detected using level (m). The silence is defined as the continuation of the condition level (m)<Th for one second time period or longer. Herein, one second is assumed to include sixteen successive time series of 64 msec, and Th is a certain threshold value. In this embodiment, Th is determined by measurement, that is, previously the environmental data is measured without target sound, and the average of the environmental data is multiplied by a constant to determine Th (for example double). When a silence is detected, chord (1)=NULL is operated and the information of the silence is transmitted to the command interpreter 303.

In the step S12, f_tone (m) is converted from the index of Fourier transformation to the index of tone name. The value of $\Delta f \times f\_tone$ (m) converted to frequency is compared with f(i, oct) in the equation 5 at i=0, 1, 2, . . ., 11, oct=0, 1, 2, 3, 4, and i_max, oct_max, which are indexes of the nearest frequency f(i_max, oct_max) are determined. Next, in the step S13, for simplification, p_tone (m)=i_max+ oct_max×12 is operated.

Next, the process proceeds to the step S14, the step S14 judges whether the tone level (m) is larger than a prescribed threshold value Th or smaller than the prescribed threshold value Th. When the level (m) is judged to be a value equal to or larger than the threshold value Th, the process comes to an end and starts to process the next speech frame (m=m+1). On the other hand, when the level (m) is judged to be a value smaller than the threshold value Th, the process proceeds to the step S15, and counts up the value of a variable (muon_count) for counting the number of successive silences by one.

Next, the step S16 judges whether the value of a variable muon_count is a value equal to or larger than sixteen or a value smaller than sixteen. When the value of the variable muon_count is judged to be a value smaller than sixteen, the condition is judged to be non-silence, the process comes to an end and starts to process the next speech frame ($m_{next}=m_{current}+1$)

On the other hand, the value of the variable muon_count is judged to be a value equal to or larger than the threshold value Th, the condition is judged to be silence, the process proceeds to the step S17 and initializes the value of the variable (muon_count) to zero.

Next, the process proceeds to the step S18, the step S18 detects at most four successive different p_tone (m) before silence. The method for detection is described herein under.

First, p_tone (m) is analyzed, and successive three or four tone names before the section where p_tone (m) corresponds to the silence is determined. Herein, it is assumed that a silence is detected when the index m is a certain value of M. When, the range m=M−15, . . . , M is a silence range, therefore, p_tone (m) is sought successively toward upstream in time from m=M−16. The seeking is continued in the order of p_tone (m), m=M−16, M−17, . . . , until at most four different tone names are detected or the seeking on entire memory is completed. As described herein above, successive three different tone names or four different tone names are detected.

Next, the process proceeds to the step S19, only when successive three different tone names or four different tone names were detected in the step S18, a chord (chord (1)) is detected and identified using these tone names, and the process comes to an end.

The reason of the at least four different tone names is that detection and identification of a chord is simplified as described hereinafter. Various chords are defined such as major, minor, 7th, minor 7th, and diminish, however, in this embodiment for simplification, only major, minor, and 7th are detected and other chords are invalidated. The arrangement of tone name in the order from low tone to high tone on the time axis is validated and other input arrangements are invalidated. As the exception, the arrangement from high tone to low tone is used for indication of the end of a sentence. Here again, p_tone (m) is converted to the expression of separate tone name and octave. This expression is an expression by i and oct in the equation 5, i and oct are defined by the equation 7 and equation 8 presented herein under.

$$i\_max = p\_tone \ \%12 \quad \text{(Equation 7)}$$

$$oct\_max = (p\_tone - i\_max)/12 \quad \text{(Equation 8)}$$

In the equation 7, % means the residue of division. Herein "i" corresponds to the notation in the musical scale as described herein under. i=0, 1, 2, . . . , 11 corresponds in the order to C, C#(Db), D, D#(Eb), E, F, F#(Gb), G, G#(Ab), A, A#(Bb), and B. The internal of () means the same tone as the external of (), for example, C# is the different notation of the same tone as that of Db.

A successive arrangement of three tones of C-E-G on the time axis is assigned as C-major, a successive arrangements of C-D#-G is assigned as C-minor, and a successive arrangement of C-E-G-A# is assigned as C-7th. The corresponding relationship for other arrangements is shown in FIG. 18. Chord names such as C0-major and C0-minor is assigned to the actual chord (1) as the character-string information. Herein, "0" of C0 indicates the octave, and "C0-major" means the major chord with a tone name as fundamental tone which corresponds to the tone of oct=0, i=0 in the equation 5. As described herein above, a silence is the chord (1)=NULL, namely, NULL string, an invalid chord sends the chord (1)="NG".

Further, as described herein above, a chord having a time series arrangement from high tone to low tone is used for indication of the end of a sentence, in this case, the end chord sends with adding the characters of "end-" at the head of the character string such as chord (1)="end-D1-major". The chord (1) obtained as described herein above is fed to the command interpreter 303 next. 1=0, 1, 2, . . . is an index for treating the chord as the time series data, and increases for every detection of a chord. The increment is cleared when 1 increases to a certain number or the command interpretation is finalized.

Figure 10:
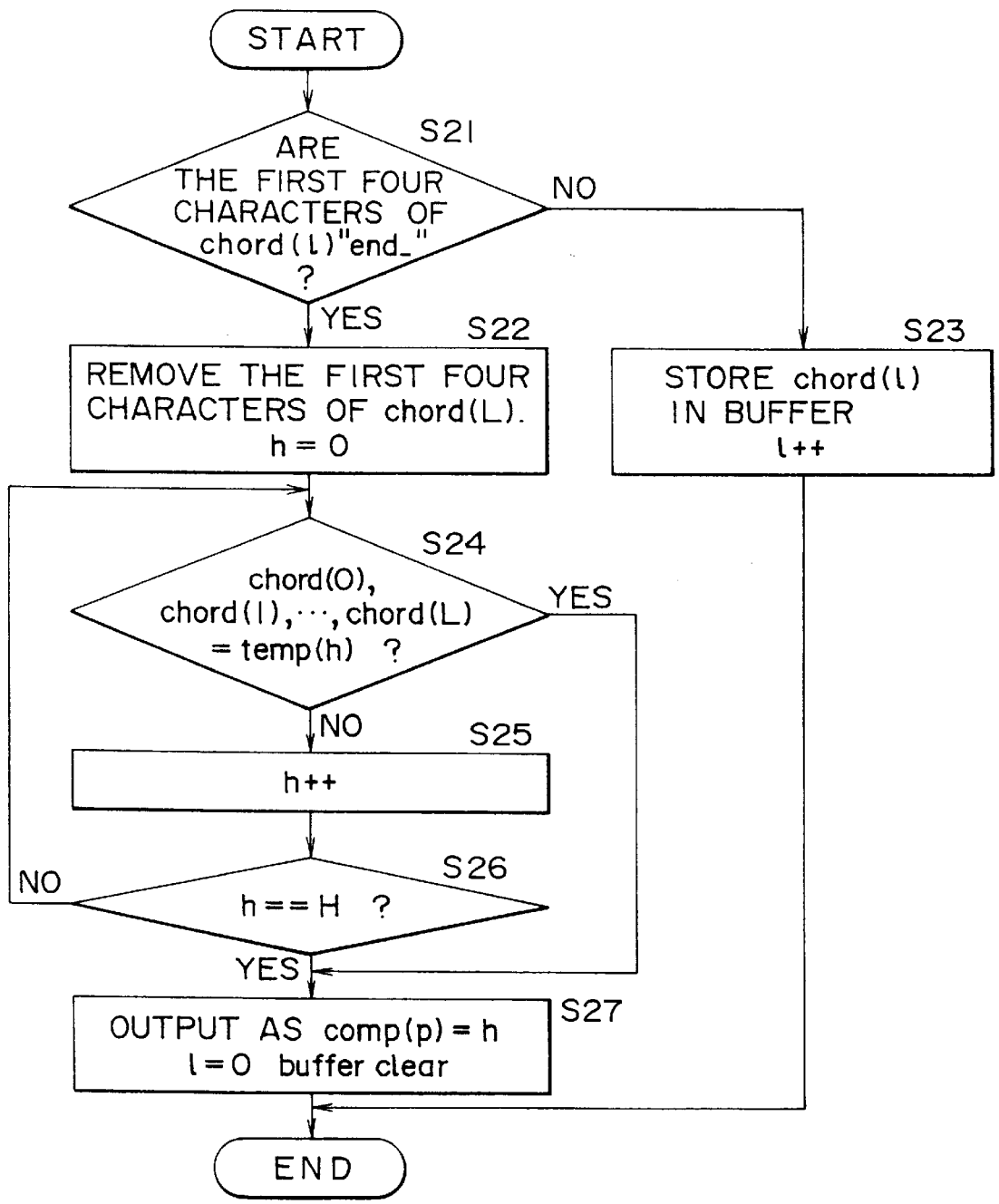
FIG. 10 is a flow chart for illustrating a processing example of a command interpreter 303.

Next, processing procedures in the command interpreter 303 is described referring to the flow chart in FIG. 10. The chord interpretation may be considered as word recognition in the usual speech recognition, on the analogy of the case, the command interpretation may be considered as sentence recognition. Therefore, first in the step S21, a chord added with "end-" is detected as the chord (1) which is equivalent to a punctuation of a sentence. In other words, the step S21 judges whether the first four characters are "end_" or not. When the first four characters are judged not to be "end_", the process proceeds to the step S23 to store the chord (1) in the buffer, and next 1 is counted up by one, then, the process comes to an end.

On the other hand, when the first four characters are judged to be "end-", that is, the end of a sentence is detected, the process proceeds to the step S22, the chord (1) added with "end-" is indexed by substituting 1 with L, and the character string "end-" added to the chord (L) is removed. h, which is the index for indicating H-pattern described hereinafter, is substituted with 0 to initialize.

Next, in the following steps from S24, chord (1) (wherein 1=0, 1, 2, . . . , L−1, L) stored in the buffer before the chord (L) is recognized as a sentence. In this embodiment for simplification, the chord (1) is examined whether it coincides exactly with any one of certain number H types of patterns previously stored (temp (h) wherein h=0, 1, . . . , H−1) for command interpretation.

In detail, in the step S24, chord (0), chord (1), . . . , chord (L) are judged to be coincident with any of H pattern temp (h). When chord (0), chord (1), chord (L) are judged not to be coincident with H pattern temp (h), the process proceeds to the step S25, and the index h is counted up by one.

In the next step S26, the step S26 judges whether the index h is identical with the certain number H, that is, chord (0), chord (1), . . . , chord (L) are identical with any of H pattern temp (h). When the index h is judged to be not identical with the certain number H, the process returns to the step S24, the processing of the step S24 and following steps are operated repeatedly. On the other hand, when the index h is judged to be identical with the certain number H, the process proceeds to the step S27.

On the other hand, in the step S24, chord (0), chord (1), . . . , chord (L) are judged to be identical with the pattern temp (h), the process proceeds to the step S27.

In the step S27, h is outputted as comp (p) resulted from the command interpretation, then, the index 1 of comp (p) is substituted with 0 to initialize, and the process comes to an end.

The command interpreted as described herein above is outputted as comp (p)=0, or 1, or 2, . . . , or H−1. When the chord (1) is not identical with any of H types of patterns, comp (p)=H is outputted.

The description of the structure and operations of the tone name identifier is completed here.

Figure 11:
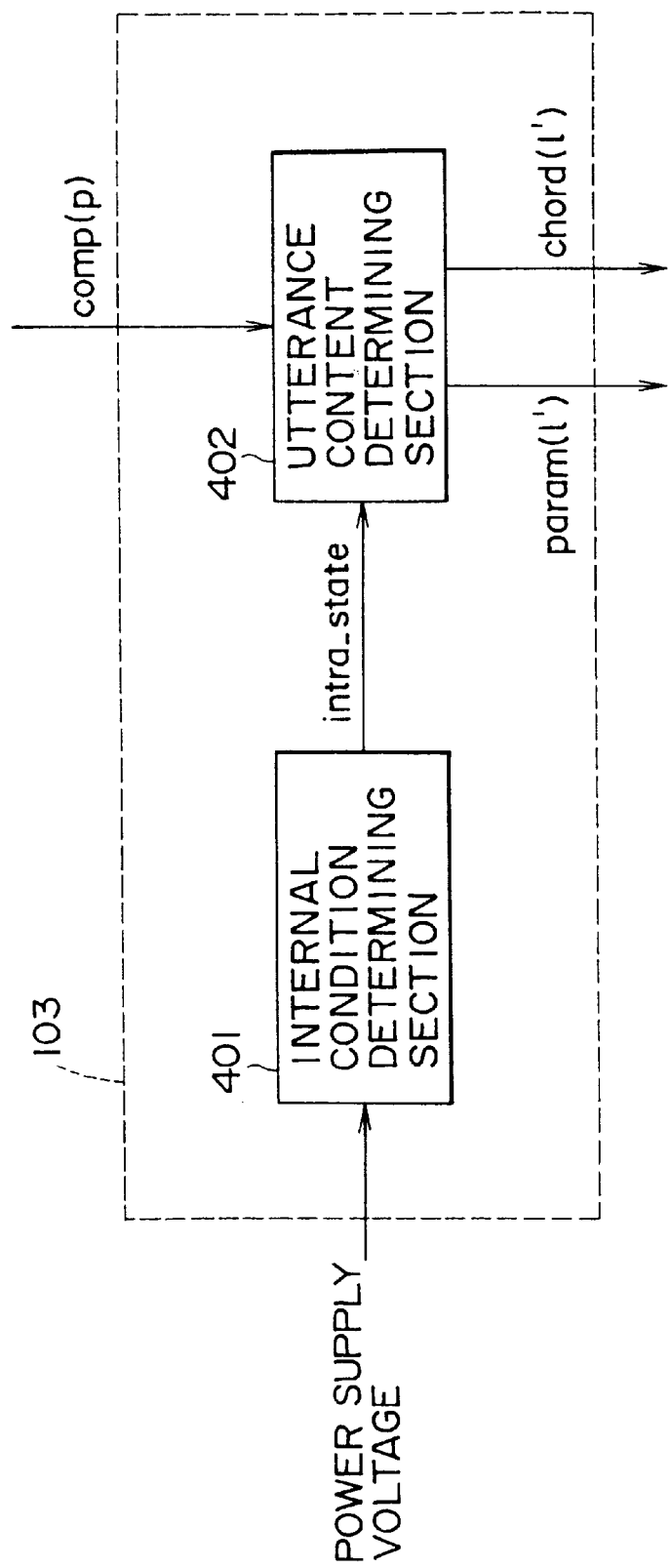
FIG. 11 is a block diagram a structural example of the utterance generator 103.

Next, the utterance generator 103 will be described hereinafter. FIG. 11 is a block diagram for illustrating structural details of an example of utterance generator 103. As shown in FIG. 11, the utterance generator comprises an internal condition deciding section 401 and utterance content deciding section 402. The utterance generator 103 receives the recognition result (comp (p)) outputted from the command interpreter 303 of the tone name identifier 102 (FIG. 6). The internal condition deciding section 401 is supplied with a power voltage from a battery not shown in the figure, and supplied with information from a battery sensor for monitoring built-in timer and battery voltage.

Upon receiving input of battery sensor information for monitoring the internal timer and battery voltage to the internal condition deciding section 401, the input causes state transition. In this embodiment, for simplification, the condition includes three states, in detail, when the value of the battery sensor is equal to or smaller than a prescribed threshold value THR_1, the condition is designated as the state 1 (OUT_S=1), when the value of the battery sensor is larger than a prescribed threshold value THR_1 and equal to or smaller than a prescribed threshold value THR_2, the condition is designated as the state 2 (OUT_S=2), and the value of the battery sensor is larger than a prescribed threshold value THR_3, the condition is designated as the state 3 (OUT_S=3). A signal Now is applied additionally, Now=1 is generated from the internal timer every 20 seconds. The signal Now is outputted to the utterance content deciding section 402.

On the other hand, the utterance content deciding section 402 receives the recognition result from the command interpreter 303 and output OUT_S from the above-mentioned internal condition deciding section 401, and determines the content to be uttered based on a certain rule. In this embodiment, conversation is operated using chord system, therefore, as the rule for example, an output table when a sentence having K chords previously registered as time series of the musical scale is inputted is provided. An example of the table is shown in FIG. 18 for the number of sentences of six. This table is equivalent to the number of commands of H=7 including silence in the above-mentioned command interpreter 303. Suitable chord time series chord (1') and parameter param (1') representing the type of an instrument and the length and level of a single tone are stored in the sentence T0, . . . , T6. Herein, the param (1') is expressed as param (1').kind, param (1').length, and param (1').level respectively according to the description of the programming language C.

For easy understanding, assuming that this embodiment is incorporated in a robot system, sentences in the table are provided with meanings. The sentence T1 means "move forward". The sentence T2 means "stop moving". The sentence T3 means "replace the battery". The sentence T4 means "persevere". The sentence T5 means "yes". The sentence T6 means "no". The sentence T0 means "no utterance". The output signals S1, S2, and S3 are outputs all from the internal condition deciding section 401, and corresponds to the above-mentioned state 1, state 2, and state 3 respectively. The output for the sentence input of T0 is different depending on if the output from the above-mentioned internal condition deciding section 401 is Now=1 or Now=0.

For example, based on the rule as described in FIG. 18, a system which will reply "yes" or "no" responding to the indication of "move forward" or "stop moving", ask for "replace battery" when the battery is exhausted, and reply "persevere" when another robot says "replace the battery" is structured.

For example, if the robot receives no indication (input of the sentence T0) and the battery is exhausted in the state S1, the robot utters the sentence T3 "replace the battery" for every input of the signal Now=1 generated every 20 seconds. If the robot is in the condition of the state S2 or S3, the robot utters nothing. Upon receiving "move forward" (the sentence T1), the robot replies "no" (sentence T6) when in the state S1 and replies "yes" (sentence T5) when in the state S2 or S3.

Upon receiving an indication of "stop moving" (sentence T2), the robot replies "yes" (sentence T5), and replies "persevere" when another robot utters "replace the battery" (sentence T3). Upon receiving an utterance "persevere" (sentence T4) from another robot or receiving the indication of "persevere" the robot replies "yes" (sentence 5). To the sentence T5 ("yes") and the sentence T6 ("no"), the robot replies nothing.

Next, the acoustic signal synthesizer 104 is described. FIG. 13 is a block diagram for illustrating a detailed structural example of the internal of the acoustic signal synthesizer 104. In the acoustic signal synthesizer 104, the chord information is converted to the time series of tone name o_tone (m'), m'=0, 1, 2, using the time series of chord chord (1') and parameter param (1') by the tone name generator 501, and the one-dimensional wave form h (k), k=0, 1, 2, . . . which is determined based on o_tone (m') and param (1') is generated by the synthesizer 502, and an analog signal h (t) (wherein t represents the time) is outputted by the D/a converter 503.

In the tone name generator 501, the reversed conversion of the conversion operated in the chord identifier 302 is operated. In other words, the tone name generator 501 generates successively tone names o_tone (m') usually from low tone to high tone for the chord name. For example, for chord (1')="C0-major", a tone name time series comprising C, E, and G with the reference tone of C at oct=0 is generated. For chord (1')="end-C0-major", a tone name time series comprising G, E, and C in arrangement from high tone to low tone is generated. Actual o_tone (m') data are integers larger than zero of i+oct×12 for i and oct of the equation 5. In detail, if chord (1')="C0-major" is assumed, o_tone (0)=0 (C), o_tone (1)=4 (E), o_tone (2)=7 (G), o_tone (3)=−1 (silence) are outputted. Herein (C), (E), and (G) mean tone names, o_tone (3)=−1 is a datum which means silence.

Next, in the synthesizer 502, a digital wave form h (k) of an actual acoustic signal is generated using the o_tone (m') and param (1'). For simplification, chord (1')="C0-major", thereby, the above-mentioned output (0, 4, 7, and −1) is inputted as the o_tone (m'). On the other hand, the length, level, and type prescribed by param (1') are prescribed in the synthesizer 502. Examples of the synthesizer include commercially available electronic instruments, personal computers and video game players incorporated with an inexpensive LSI for FM sound source or sampling sound source.

In this embodiment for simplification, the wave form of five tones of an electron instrument sampled at 8000 Hz is stored previously, h (k) is generated by changing the level and length. A usual synthesizer LSI stores the tone of basic cycle, and generates various tone names by filtering it to convert the sampling rate, however, in this embodiment for simplification, the length is controlled by the operation in which tones of all types and all tone names are stored for one second, and the amplitude is reduced to zero at the length prescribed by param (1').length. Therefore, a tone longer than one second is not prescribed. For the level, the stored wave form is multiplied by param (1')/256. Finally in the D/A converter, the converter A/D-converts at a sampling rate of 8000 Hz to obtain an analog signal h (t).

Here description of the acoustic signal generator 104 is completed.

This embodiment addresses on the point that an interactive system is structured by combining acoustic signals with high resolution performance to environmental noise and disturbing wave and combining a robust recognizing system and synthesizing system. When the system of this embodiment is operated using a whistle, the system is operated normally in usual office environment and also in the case that human conversation is mixed in the input signal g (t). The reason is described herein under. First, in terms of frequency structure, the spectrum of human conversation distributes widely, therefore, the spectrum peak is low comparing with sounds of a whistle and instruments which concentrates to some frequencies, the utterance with stable pitch is not natural for the utterance of, for example, Japanese language, in a usual conversation, when the conversation is detected at the analysis length pitch of 20 msec, the detection of two successive same pitches occurs scarcely.

The change of pitch frequency is different depending on the sentence and situation, however, typically the pitch frequency changes between 100 Hz and 200 Hz upward and downward in 500 msec time period, therefore, as described in the embodiment, the result of the equation 3 is subjected to the low pass filter for every frequencies, and so far as successive combination of the majority filter such as the equation 6 and the four blocks (256 msec) is applied, human conversation satisfies seldom this condition.

In this embodiment, the frequency resolution is about 16 Hz, however, a band pass filter with the resolution of several Hz is used in parallel in stead of Fourier transformation in the frequency analyzer 203 to analyzer thereby, the fluctuation of frequency is analyzed more in detail, and it is possible to distinguish a speech uttered to be recognized in this embodiment and a speech uttered naturally. Therefore, the information of combined successive tones is transmitted as described in this embodiment, thereby, in the space of office or home, pseudo-conversation between a system and a person, a system and a system, and a person and a person is possible regardless of disturbing usual natural human conversation.

Conventional speech recognitions involve the removal of disturbing sounds and creation of maps to separate properly the disturbing sounds and target speech, on the other hand, this embodiment involves improvement of disturbance preventing performance by combining easily separable acoustic signals from mixed disturbing sounds, this is a new methodology. In other words, conventionally, for example, the mapping is the only freedom for designing a recognizer for improvement of noise preventing performance, however, in this embodiment, the freedom is provided not only to the mapping but also to the structuring of target acoustic signal itself.

Figure 14:
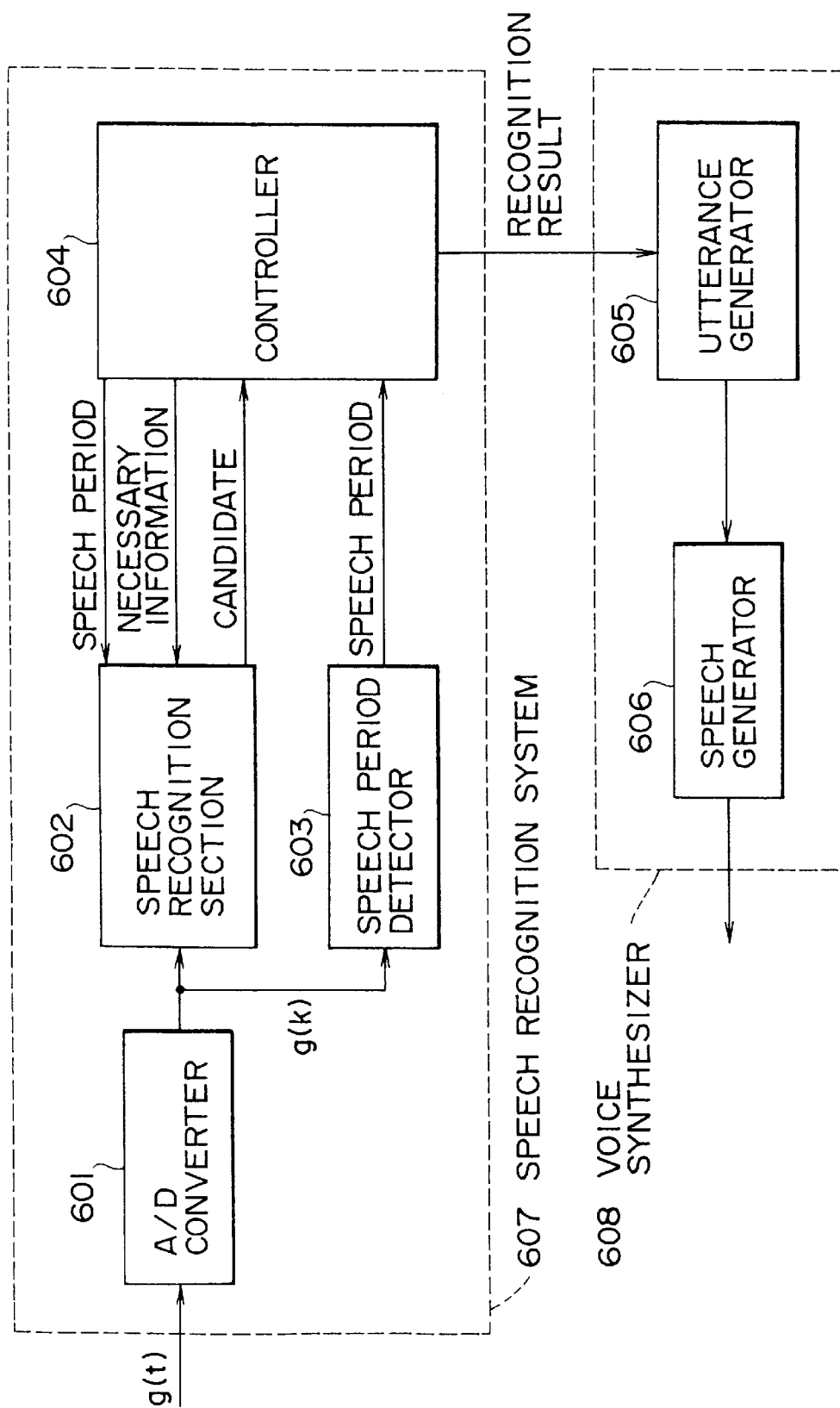
FIG. 14 is a block diagram for illustrating the structure of another embodiment of an interactive system in accordance with the present invention.

FIG. 14 is a block diagram for illustrating the structure of another embodiment of an interactive system in accordance with the present invention. In this embodiment, a phoneme string comprising solely vowels, which is resistive to noise, instead of tone name is recognized and synthesized, thereby, the noise resistance and disturbing sound resistance are improved. In FIG. 14, the whole structure of this embodiment is shown. In this embodiment, the structure is divided to two groups. The speech recognition system 607 (recognizing means) comprises A/D converter 601, speech recognition section 602, speech period detector 603, and controller 604, and the voice synthesizer 608 (synthesizing means) comprises an utterance generator 605 and speech generator 606, and both speech recognition system 607 and voice synthesizer 608 constitute the interactive system.

Before description of the structure of this embodiment, HMM (Hidden Markov Model) speech recognition method is described herein briefly though HMM is explained in various literatures and patent specifications.

Now, when the probability that a feature vector corresponds to a prescribed speech category ws is expressed as P(ws, y), the feature vector belongs naturally to the speech ws which maximizes the value shown by the following equation 9.

$$P(ws, y) = P(ws)P(y|ws) \quad \text{(Equation 9)}$$

In the equation 9, P(ws) is a priori probability for generation of the speech ws, and P(y|ws) is a probability for obtaining the feature vector when the speech ws is generated. HMM method is a method to estimate the speech ws which maximizes P(ws, y) of the equation 9. The model of HMM comprises passes which represent transition between states S1, S2, . . . , SN (N represents the number of states) as shown in FIG. 12A, as the condition transits, symbols are outputted.

In the speech recognition, a model which involves only two passes, namely a pass for transition to itself and a pass for transition to the next state is usually used as shown in FIG. 15B. In the discrete HMM method out of the HMM method, the probability for generation of a symbol series Y=(y1, y2, . . . , yT) obtained by, for example, vector quantization processing of the feature vector of the speech in each model is calculated, and the model having the largest probability is recognized as the result.

Wherein,

N: the number of states which models have,

Y=(y1, . . . , yT): symbol series,

T: length of symbol series, a_i_j: transition probability for transition from the state i (Si) to the state j (Sj), b_i_j (k): output probability for generation of the symbol k during the transition from the state i to the state j.

K: the number of symbols (type of symbols)

π=(π1, π2, . . . , πN): initial condition probability representing the probability that the initial condition is i state, parameters are represented as described herein above, then, the probability for observation of the symbol series Y from the model θ, namely P(Y|θ), is determined as described herein under.

(ST1) The initial condition i is decided based on the initial condition probability π, and the time t=1 is assumed.

(ST2) The transition from the state i to the state j is decided based on the transition probability a_i_j.

(ST3) The symbol y t which is to be outputted during the transition from the state i to the state j based on the output probability b_i_j (k) is decided.

(ST4) If t=t+1, i=j, t <=T, the process returns to ST2.

In the speech recognition, usually the initial condition and final condition correspond to one state individually, therefore, hereinafter the condition at t=1 is designated as S1 and the condition at t=T is designated as SN. Therefore, the initial condition probability is solely π1 and zero for other cases.

The forward prediction probability that the model θ outputs the symbol series y1, y2, . . . yt and exists in the state i is designated as ai (t), from the definition of the output of the model (ST1, ST2, ST3, and ST4) described herein above, the probability P(Y|θ) that the model θ outputs the symbol series Y=(y_1, y_2, y_T) is calculated as described herein under.

when t=1, i=1, α1(t)=1 when t=2, 3, . . . , T, $$\alpha i(t) = \Sigma\_j(\alpha i(t-1) \times a\_i\_j \times b\_i\_j(y\_t))\ P(Y|\theta) = \alpha N(T) \quad \text{(Equation 10)}$$

In the equation 10, Σ_j represents the summation, and it is active only when the transition from the state i to the state j is allowed. Therefore, the model θ which maximizes P(Y|θ) for the symbol series Y=(y_1, . . . , y_T) obtained from the speech is recognized as the result.

Next, the learning of the model is described. In the learning of the model, the above-mentioned forward prediction probability αi (t) is obtained form the symbol series Y for leaning, and the backward prediction probability βi (t) for outputting afterward the symbol series y_(t+1), y_(t+2), . . . , y_T in the state i at the time t is obtained from the equation 11 described herein under.

when t=T i=N, βi(t)=1 when t=T−1, T−2, . . . , 1, $$\beta i(t) = \Sigma\_j(a\_i\_j \times b\_i\_j(y\_(t+1)) \times \beta j(t+1)) \quad \text{(Equation 11)}$$

The above equation Σ_j is active only when transition from the state i to the state j is allowed in the given model.

Then, $a\_i\_j$ and $b\_i\_j(k)$ are renewed according to the following equation 12.

$$\gamma\_i\_j(t) = [\alpha i(t-1) \times a\_i\_j \times b\_i\_j(y\_t) \times \beta i(t)] / \alpha N(T)$$

$$\hat{a}\_i\_j = [\Sigma\_t(\gamma\_i\_j(t))] / [\Sigma\_t(\Sigma h(\gamma\_i\_h(t)))]$$

$$\hat{b}\_i\_j(k) = [\Sigma\_t: y\_t = k(\gamma\_i\_j(t))] / [\Sigma\_t(\gamma\_i\_j(t))]$$

(Equation 12)

Wherein, $\hat{a}\_i\_j$ and $\hat{b}\_j\_j$ (k) represent the renewed transition probability and output probability respectively. The summation $h=1, \ldots, N$ in the above equation is active only when the transition from the state i to the state h is allowed. Also, the summation of $t:y\_t=k$ is active only when the symbol k is originated at the time t.

The learning method according to the equation 12 is called as Baum-Welch's re-estimation method.

$a\_i\_j$ and $b\_i\_j$ (k) which are renewed according to the equation 12 involve only one certain learning symbol series, the model subjected to the learning as described herein above generates a certain symbol series at a high probability.

However, this system can not cope with the scattering of speakers and utterances.

To solve the problem, it is required to give the learning to the model θ so as to output some symbol series at high probability. For example, when q-th symbol series out of Q types of symbol series is formulated as $Y^q=(y\_1q, \ldots, y\_T^q)$, the model θ is provided with learning so that the product of the probability $P(Y^q|\theta)$ for observation of each symbol series $Y^q$, $q=1, 2, \ldots, Q$ is maximized.

The probability is obtained by the following equation 13 that Baum-Welch's re-estimation method is extended to cover multiple series.

$$\gamma\_i\_j^q(t) = [\alpha i(t-1) \times a\_i\_j \times b\_i\_j(y\_t^q) \times \beta j(t)] / \alpha N(T)$$

$$\hat{a}\_i\_j = [\Sigma\_q(\Sigma\_t(\gamma\_i\_j^q(t)))] / [\Sigma\_q(\Sigma\_t(\Sigma\_h(\gamma\_i\_h^q(t))))]$$

$$\hat{b}\_i\_j(k) = [[\Sigma\_q(\Sigma\_t: y\_t^q = k(\gamma\_i\_j^q(t)))] / [\Sigma\_q(\Sigma\_t(\gamma\_i\_j^q(t)))]]$$

(Equation 13)

The case that the model learns individually corresponding to each word is described herein above, however, actually the concatenation learning for concatenating models is required. For the concatenation learning of model, based on words registered in a word dictionary prepared previously, phonemes or phoneme models are concatenated each other, and the concatenated phonemes or phoneme models is treated as a word model, then, the symbol series $Y^q$ prepared as symbol series for word learning is subjected to the learning.

For the case that leaning of M phonemes or phoneme models is operated individually, parameters (transition probability and output probability) of the m-th model (model m) is represented as $a\_i\_j^m$ and $b\_i\_j^m(k)$, and the condition that the model m is concatenated with phoneme or phoneme model (concatenation model) is represented as u or v. Further, when the condition of concatenation model transits from u to v, the condition that the condition u belongs to the model m is represented as (u->v)m, then, $a\_i\_j^m$ and $b\_i\_j^m(k)$ are renewed (re-estimation, learning) according to the following equation 14.

$$\hat{a}\_i\_j^m = [\Sigma\_(u=i, v=j)(\Sigma\_q(\Sigma\_t(\gamma\_u\_v^q(t))))] / [\Sigma\_(u=i)(\Sigma\_q(\Sigma\_t(\Sigma\_(h: (u \to h)inm) (\gamma\_u\_h^q(t)))))]$$

$$\hat{b}\_i\_j^m(k) = [\Sigma\_(u=i, v=j)(\Sigma\_q(\Sigma\_t: y\_t^q = k(\gamma\_u\_v^q(t))))] / [\Sigma(u=i)(\Sigma q(\Sigma t(\gamma uv^q(t))))]$$

(Equation 14)

If the concatenation model uses the same model m in a plurality of times, for example, in the case that the model m comprising three states S1, S2, and S3 is used two times, the concatenation model has consequently six states S1, S2, S3, S1, S2, and S3. Therefore, for example, the state S1 at the head out of states of the model m S1, S2, and S3 becomes identical with the fourth state in the condition of the head state of the concatenation model. As described herein above, a plurality of conditions u or v of the concatenation model is occasionally identical with one state i or j of the model m.

In the equation 14, when the condition u or v of the concatenation model is identical with the state i or j of the model m, the summation of $\Sigma\_(u=i, v=j)$ is executed. Further, when the condition u of the concatenation model is identical with the state i of the model m, the summation of $\Sigma\_(u=i)$ is executed.

The summation of $\Sigma\_(h:(u->h)inm)$ is executed only when the transition of the concatenation model from the condition u to the condition h is allowed and the condition u of the concatenation model belongs to the model m.

Further in the equation 14, when a model m is concatenated subsequently to the model m, and a certain condition u of the concatenation model becomes the final condition (u=N) of the model m, the condition v resultant from transition from the condition u becomes the initial condition of the model concatenated just after the model m.

Next, speech recognition using the discrete HMM method described herein above is described. First, the learning of model (concatenation learning) is executed according to the above-mentioned equation 12 or equation 13 ($a\_i\_j^m$, $b\_i\_j^m(k)$ is expressed as $a\_i\_j$, $b\_i\_j(k)$ in the same manner as used for the equation 12 hereinafter) using the learning series Y prepared for learning, then, the transition probability $a\_i\_j$ and output probability $b\_i\_j(k)$ of the model θ is obtained.

When the symbol series Y is observed from the speech during the recognition, the probability $P(Y|\theta)$ that the model m outputs the symbol series is calculated according to the equation 10 by forward method. $P(Y|\theta)$ can be calculated also by, for example, Viterbi method.

The processing described herein above is executed on other models than the model θ, and as described hereinbefore, the model having the largest probability P is recognized as the result.

Next, the speech recognition system 607 comprising A/D converter 601, speech recognition section 602, speech period detector 603, and controller 604 in FIG. 14 is described.

Figure 16:
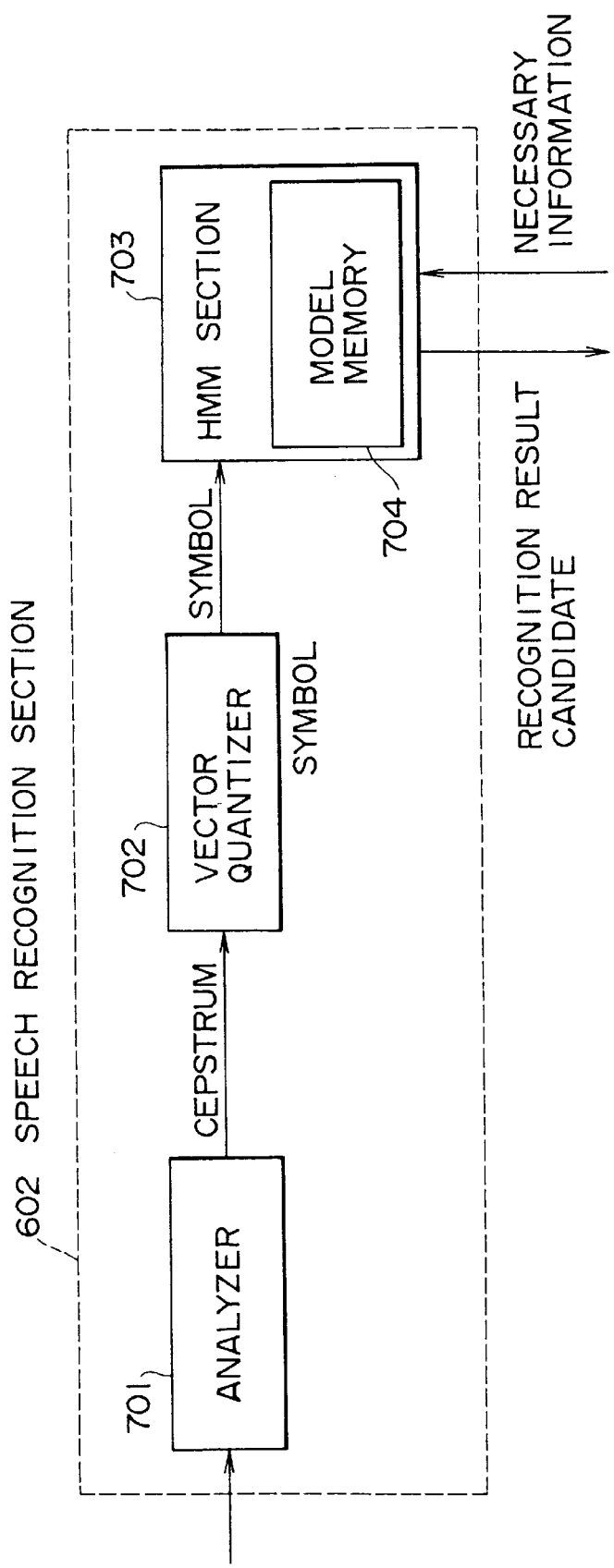
FIG. 16 is a block diagram for illustrating a structural example of a speech recognition section 602.

The A/D converter 601 converts an input signal from a device such as microphone to a digital signal using a prescribed sampling frequency, and output the digital signal to the speech recognition section 602 and the speech period detector 603. The speech recognition section 602 comprises, for example as shown in FIG. 16, an analyzer (analysis means) 701, vector quantizer 702, and HMM section 703. The analyzer 701 executes acoustic analysis of the digital signal from the A/D converter 601 with a prescribed frame unit, and outputs a feature vector of the speech obtained as the result of the analysis to the vector quantizer 702. The vector quantizer 702 executes vector quantization of the feature vector from the analyzer 701 using a chord book previously prepared, and outputs a symbol obtained as the result to the HMM section 703. The HMM section 703 has a model memory which stores the phoneme model (transition probability a_i_j and output probability b_i_j (k)) subjected to the concatenation learning as described hereinbefore using a speech for learning.

The HMM section 703 executes speech recognition of the symbol series fed from the vector quantizer 702 by the discrete HMM method described hereinbefore using the model stored in the model memory 704 based on the necessary information necessary for speech recognition processing fed from the controller 604 (in FIG. 14) as described hereinafter. Recognition result candidates obtained as the result of the speech recognition is outputted to the controller 604.

The speech period detector 603 shown in FIG. 14 figures out short-time power or zero-cross number of an output form the A/D converter 601, detects the period where the short-time power or zero-cross number exceeds a prescribed threshold value as a speech period, and outputs the speech period to the controller 604.

The controller 604 is provided with a built-in word dictionary not shown in the figure, selects the word addressed by the speech recognition referring to the word dictionary, and outputs the word as the necessary information to the HMM section 703 which is a constituent of the speech recognition section 602. In addition, the controller 604 outputs the speech period from the speech period detector 603 to the HMM section 703 as a necessary information.

Further, the controller 604 receives the recognition result candidates from the HMM section 703, then, selects at least one candidates out of the received candidates according to the prescribed algorithm, and outputs the selected candidates as the recognition result.

The speech recognition system 607 structured as described herein above executes speech recognition as described herein under.

In the speech recognition section, first, the analyzer 701 executes, for example, acoustic analysis processing such as linear prediction analysis with a prescribed frame unit on the output from the A/D converter 601, thereby, figures out the linear prediction coefficient with a prescribed degree. Further, the analyzer 701 figures out the cepstrum coefficient (LPC (Linear Predictive Coding) cepstrum coefficient) from the linear prediction coefficient according to a prescribed recursion equation, and outputs the cepstrum coefficient to the vector quantizer 702 as the feature vector.

The vector quantizer 702 executes vector quantization of the feature vector from the analyzer 701, and outputs the resultant symbol obtained in frame unit to the HMM section 703.

On the other hand, the speech period detector 603 detects a speech period from the output of the A/D converter 601 using the method as described herein above, and outputs the speech period to the controller 604, and the controller 604 selects at least one word which is addressed by the speech recognition (recognition target word) referring to the word dictionary. The controller 604 receives the speech period from the speech period detector 603, immediately, outputs the period and also the recognition target word to the HMM section 703 of the speech recognition section 602 as necessary information.

Upon receiving the necessary information, the HMM section 703 generates a model which corresponds to the recognition target word by concatenating phoneme models stored in the model memory 704. The HMM section 703 generates word models which correspond to all recognition target words from the controller 604 as described herein above, thereafter, the HMM section 703 calculates the probability that the symbol series fed from the vector quantizer 702 is observed from the word model as described herein above during the speech period from the controller 604. Then, the HMM section 703 outputs words which correspond to words having the probability larger than a prescribed value to the controller 604 as the recognition result candidate. The controller 604 receives the recognition result candidates from the HMM section 703, then, selects at least one word from the candidates according to a prescribed algorithm, and outputs the selected word as the recognition result.

Next, the voice synthesizer 608 comprising the utterance generator 605 and speech generator 606 shown in FIG. 14 is described.

Figure 17:
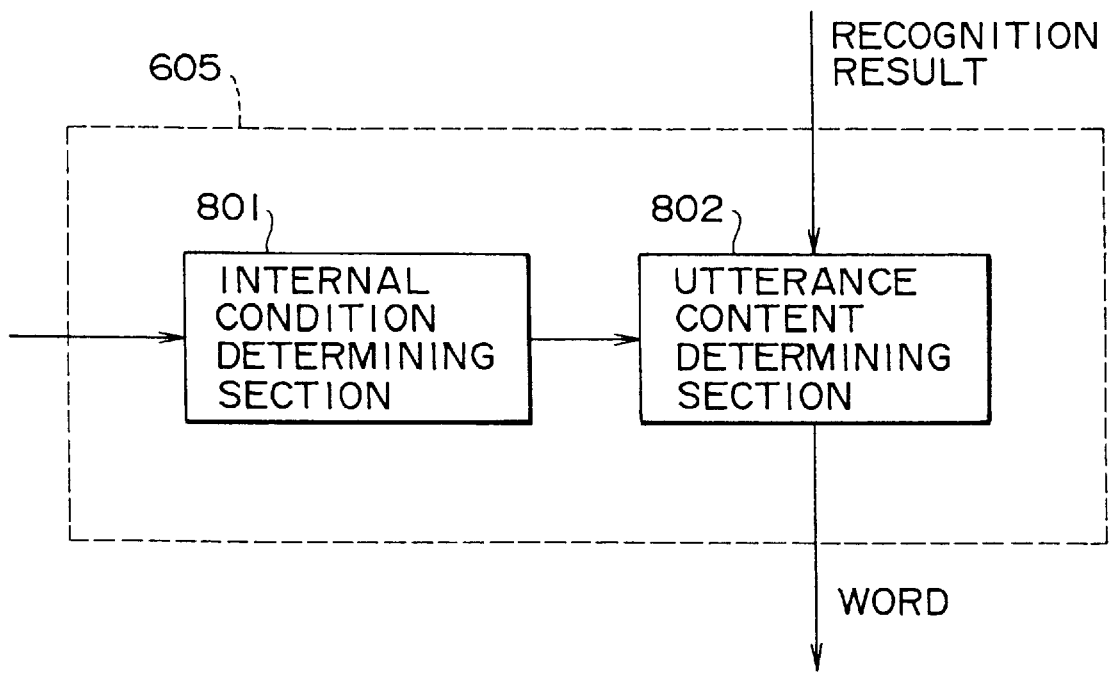
FIG. 17 is a block diagram for illustrating a structural example of an utterance generator 605.

FIG. 17 is a block diagram for illustrating a structural example of the internal of the utterance generator 605. The utterance generator 605 comprises the internal condition deciding section 801 and the utterance content deciding section 802. The utterance generator 605 receives the recognition result output from the above-mentioned controller 604.

The internal condition deciding section 801 receives information of the internal timer and battery sensor for monitoring battery voltage, and depending on the information, the condition transition occurs. In this embodiment, the transition involves three states for simplification, when the vale of the battery sensor is equal to or smaller than a prescribed threshold value THR_1, the condition is designated as the state 1 (OUT_S=1), when the value of the battery sensor is larger than the threshold value THR_1 and equal to or larger than another prescribed threshold value THR_2, the condition is designated as the state 2 (OUT_S=2), and when the value of the battery sensor is larger than the threshold value THR_3, the condition is designated as the state 3 (OUT_S=3). Further, another signal Now is introduced, and the internal timer outputs Now=1 every 20 seconds. The utterance content deciding section 802 receives the signal Now.

On the other hand, the utterance content deciding section 802 receives the recognition result from the controller 604 and output OUT_S from the above-mentioned internal condition deciding section 801, and decides the content to be uttered according to a suitable rule. As the rule, the output obtained when K units of words previously registered as time series of vowels is inputted is provided in a form of table because this embodiment involves conversation using words. An example of such table with six words are shown in FIG. 18.

For easy understanding, it is assumed that this embodiment is incorporated in a robot system, the words in the table are provided with meaning. The word T1 means "move forward". The word T2 means "stop moving". The word T3 means "replace the battery". The word T4 means "persevere". The word T5 means "yes". The word T6 means "no". The word TO means no utterance. The outputs S1, S2, and S3 are all outputs from the internal condition deciding section 801 and correspond to the state 1, the state 2, and the state 3. The output for the word input of T0 is different depending on if the output of the above-mentioned internal condition deciding section 801 is Now=1 or Now=0.

Based on the rule as described in FIG. 18, a system which will reply "yes" or "no" responding to the indication of "move forward" or "stop moving", ask for "replace battery" when the battery is exhausted, and reply "persevere" when another robot says "replace the battery" is structured.

Next, the speech generator 606 which converts the result to a speech comprising solely vowels is described. The speech generator 606 is equivalent to a synthesizer section in what is called speech synthesis, in this embodiment, the speech generator 606 selects some words from the words stored previously in word unit level and outputs the selected words. This operation is equivalent to the correspondence of the above-mentioned words from the word T1 to the word T6 to the word comprising solely vowels, and it comprises models which the HMM section 703 in the speech recognition section 602 has or vowel string similar to the word dictionary.

For example, the word T1 is assigned as "a-i-u", the word T2 is assigned as "a-i-e", the word T3 is assigned as "i-u-e", the word T4 is assigned as "i-u-o", the word T5 is assigned as "u-e-o", and the word T6 is assigned as "o-e-u". Pronounced sounds of these words are stored as digital data, and the digital data are stored in the speech generator 606 as the internal memory not shown in the figure. The speech generator 606 receives words from the utterance generator 605, then, reads-out the digital data which correspond to the words from the memory, and executes D/A conversion to covert it to an aural signal.

The second embodiment is significantly different from the first embodiment (FIG. 1) in that HMM is used for the speech recognition section 602 and phoneme series comprising solely vowels as phoneme structure is registered as word. Such phoneme design allows the system to distinguish easily disturbing sound in a noisy environment with white noise. A person usually pronounces vowels with larger power comparing with consonants, therefore, S/N ratio of input signal of the system is more improved comparing with usual natural language.

As described hereinbefore, these embodiments cope with disturbing sound and noise in speech recognition, and addresses on the design freedom for speech recognition in the development effort to realize conversation between a system and person. In other words, attentions are focused on the structural freedom of the recognition system which has been missed so far, and thus the noise preventing and disturbing sound preventing performance is improved.

The freedom is the sound itself, and it means the selection or design of phoneme having the acoustic characteristics excellent in disturbing prevention and noise prevention performance. The system utters using this phoneme, thereby, the system can be a recognition system having sufficient noise prevention and disturbing sound prevention performance with applying a usual recognition technology. In other words, though the speech recognition system does not involve a language such as Japanese and English, a word or sentence is structured using phonemes, which is signal in the audible range, having particular acoustic characteristics, and a system which is capable of recognizing the phoneme and a system which is capable of synthesizing the phoneme are structured, thereby, the recognition or interactive system excellent in noise prevention and disturbing sound prevention performance is more easily realized.

This method is different from all of three methods described in the Description of the Related Art. For example, in the field of Japanese speech recognition system, for arbitral combination of phonemes as Japanese including proper nouns, this method is definitely different from all of these three methods which are modified to improve noise prevention and disturbing sound prevention performance. In this method, combination of phonemes is selected in view of the characteristics of noise and disturbing sound, and or freedom of designing is given, therefore, the noise prevention and disturbing sound prevention performance is easily improved.

In the first embodiment, Fourier transformation is used as acoustic analysis technique, however, this invention is by no means limited to Fourier transformation. Other analysis techniques which are used for pre-treatment of usual speech recognition may be used. For example, LPC analysis is popularly used for usual speech recognition. For tone name recognition, usual pitch detection technique may be used. For example, pitch detection by zero-cross detection and pitch detection using auto-correlation are typical examples.

Further in the first embodiment, delimiter of one tone name is used for detection of silence in the tone name identifier, however, the detection of silence is by no means limited to the delimiter. Alternatively, without supposition of silence, attention is paid on three or four changed p_tone, only when these changed p tone coincides with sounds which constitute chords such as C-major and C-minor, chord (1) is outputted, otherwise the changed p tone is invalidated, and only valid time series are used for command interpretation, thus, the detection of silence may be realized. In this method, however, in the case that a chord comprises four tones such as 7th chord, a chord (1) as valid major chord is outputted before detection of fourth tone, a modification is required to solve this problem. When 7th chord is recognized at 1=L, a major chord of chord (L−1) comprising three tones preceding the 7th chord is rewritten to invalid data, thus, this operation can be the modification.

In the first embodiment, the condition that tones are inputted in the order from low tone to high tone is applied, however, in the present invention, the order of input is not limited to the order described herein above. Whether the tone arrangement comprising three or four tones is identical with a tone arrangement of a chord or not or whether the order of tones in the tone arrangement is identical with another prescribed order or not is used for recognition, thereby, the same result is realized.

In the first embodiment, the condition that tones are inputted in the order from high tone to low tone is applied for ending a sentence, however, in the present invention the condition to be applied is by no means limited to this condition. A sentence can be ended with a detection of a silence of a suitable length and also a sentence can be ended by prescribing a suitable invalid pattern. Alternatively, a particular chord may be assigned as the ending chord. A particular chord traveling may be used for ending. In the first embodiment, it is the precondition that a three tone chord has three tones and a four tone chord has four tones, however, in the present invention the chord is by no means limited to the chord which satisfies the precondition. For example, "C-major" chord may include an arpeggio such as C, E, F, E, and C which is popularly used in guitar performing.

In the first embodiment, a time series of music chord is recognized, however, the present invention is by no means limited to the time series of music chord. For example, a chord itself may function as a command. Without limiting to chord, a time series of tones may represents the length and height information, this method is considered as a modification of the first embodiment.

In the first embodiment, absolute tone name and chord are recognized, however, it is easy to recognize the relative frequency change, relative tone name change, or relative chord change, namely to recognize what is called the deviation of tune.

In the first embodiment, examples of interaction between a person and a system, and a person using an instrument and a system are described, however, the present invention is by no means limited to these examples. It is easily understandable from the embodiment that, if a plurality of systems has a structure of the embodiment individually, interaction is possible between systems and a person can recognize the interaction by hearing. Conversation between persons is possible using this phoneme, and a system can understand this conversation.

In the second embodiment, vowels are recognized, however, it is an easy modification to recognize tone names and chords as in the first embodiment using HMM. For example, a speech of do, re, mi, . . . using a voice "a . . . " is recognizable.

In the second embodiment, HMM is used for recognition of vowels, however, the present invention is by no means limited to the HMM.

In the second embodiment, the method of speech synthesis involves the output of wave form comprising vowels previously stored, however, the present invention is by no means limited to this method. It is easy to analogize that the speech synthesis by the rule for speech synthesis and the speech synthesis by vocal track for speech synthesis are used. In the use of these speech synthesis, it is easy to introduce natural fluctuation to the speech to obtain vowel utterance similar to human speech.

In the second embodiment, the word recognition is used for speech recognition, however, the present invention is by no means limited to the word recognition. The extension to sentence is easy.

In the second embodiment, vowels of a, i, u, e, and o are used as phonemes, however, the present invention is by no means limited to these vowels. For example, in the case that consonants are pronounced but the consonants are ignored for recognition and solely time series of vowels is recognized, utterance is improved without degradation of noise prevention performance. The use of other phonemes which is easy to distinguish from noise is a modification of the present invention.

In the second embodiment, it is possible to remove previously phonemes which are difficult to distinguish from noise. For example, it is known that the phoneme of i has smaller output power than other vowels, it is possible to design a word using the combination of only phonemes which does not include such phonemes having small output power.

By using a speech recognition system as claimed in the claim 1, which system is structured so that sounds comprising phonemes or time series of phonemes having the acoustic characteristics for easy separation of noise and disturbing sound are analyzed by the analysis means, the affection of disturbing sound and noise is suppressed. Therefore, target sounds are detected or recognized reliably.

By using a speech recognition system as claimed in the claim 10, which system is structured so that sounds comprising phonemes or time series of phonemes having the acoustic characteristics for easy separation of noise and disturbing sound are synthesized by the synthesis means, the target sound which is not susceptible to the affection of disturbing sound and noise is synthesized. Therefore, it is possible that a conversational partner recognizes the target sound reliably.

By using a speech recognition system as claimed in the claim 17, which system is structured so that sounds comprising phonemes or time series of phonemes having the acoustic characteristics for easy separation of noise and disturbing sound are analyzed by the analysis means, and sounds comprising phonemes or time series of phonemes having the acoustic characteristics for easy separation of noise and disturbing sound are synthesized by the synthesis means, it is possible to recognize the target sound without affection of disturbing sound and noise, and it is possible to synthesize target sound which is not susceptible to the affection of disturbing sound and noise. Therefore, a system which is capable of interaction between one or more of systems or between systems each other without the affection of disturbing sound and noise is structured. The system uses non-natural language for interaction, therefore, the system can be served for entertainment through interaction. Further, when the system is applied for the entertainment interaction system, it is possible to structure a more effective interaction system than the system which uses interaction of natural language.

What is claimed is:

1. A speech recognition system for recognizing speech in an environment of noise and disturbing sound, comprising:

means for receiving a sound signal, the sound signal including at least one of phonemes and time series of phonemes, and the sound signal further including at least one of noise and disturbing sound;

an analysis means for analyzing the sound signal received by the means for receiving; and a recognition means for recognizing a signal representative of said phonemes and time series of phonemes;

wherein the analysis means analyzes the sound signal by performing a frequency analysis and the result of the frequency analysis is treated as a time series in determining if a feature point of the sound signal moves in a prescribed direction in a frequency analysis space relative to a time index axis for a prescribed time period; and wherein the analysis means separates said noise and disturbing sound from said phonemes and time series of phonemes based upon said analyzing and outputs a signal representative of said phonemes and time series of phonemes to the recognition means.

2. The speech recognition system as claimed in claim 1, wherein analysis results by said analysis means are arranged in the prescribed order individually in the analysis space having a prescribed dimension, and the position of the feature points of said analysis results moves according to a prescribed rule in the time series analysis space composed of said analysis space and the time axis.

3. The speech recognition system as claimed in claim 2, wherein said feature point is a point selected from the maximum value and minimum value of said analysis result in said analysis space.

4. The speech recognition system as claimed in claim 2, wherein said motion of the position of said feature point in said time series analysis space is a motion in the direction inclined with a prescribed angle to said time axis for a prescribed time or longer.

5. The speech recognition system as claimed in claim 2, wherein said motion of the position of said feature point in said time series analysis space is a motion in the direction parallel to said time axis for a prescribed time or linger.

6. The speech recognition system as claimed in claim 1, wherein the pitch of said sound does not change exceeding a prescribed time beyond a prescribed range.

7. The speech recognition system as claimed in claim 1, wherein said phoneme is a vowel.

8. The speech recognition system as claimed in claim 1, wherein said analysis means executes linear convolution operation.

9. The speech recognition system as claimed in claim 1, wherein said system is provided with the recognition means including Hidden Markov Model, and said recognition means recognizes the sound which corresponds to said analysis result by said analysis means.

10. A speech synthesis system for synthesizing speech in an environment of noise and disturbing sound, comprising:
   a synthesis means for synthesizing speech;
   an analysis means coupled to said synthesis means for analyzing a sound signal including at least one of phonemes and time series of phonemes, and the sound signal further including at least one of noise and disturbing sound; and
   a recognition means for recognizing a signal representative of said phonemes and time series of phonemes;
   wherein the analysis means analyzes the sound signal by performing a frequency analysis and the result of the frequency analysis is treated as a time series in determining if a feature point of the sound signal moves in a prescribed direction in a frequency analysis space relative to a time index axis for a prescribed time period; and
   wherein the analysis means separates said noise and disturbing sound from said phonemes and time series of phonemes based upon said analyzing and outputs a signal representative of said phonemes and time series of phonemes to the recognition means.

11. The speech synthesis system as claimed in claim 10, wherein analysis results of said sounds by prescribed analysis method are arranged in the prescribed order individually in the analysis space having a prescribed dimension, and the position of the feature points of said analysis results moves according to a prescribed rule in the time series analysis space composed of said analysis space and the time axis.

12. The speech synthesis system as claimed in claim 11, wherein said feature point is a point selected from the maximum value and minimum value of said analysis result in said analysis space.

13. The speech synthesis system as claimed in claim 11, wherein said motion of the position of said feature point in said time series analysis space is a motion in the direction inclined with a prescribed angle to said time axis for a prescribed time or longer.

14. The speech synthesis system as claimed in claim 11, wherein said motion of the position of said feature point in said time series analysis space is a motion in the direction parallel to said time axis for a prescribed time or linger.

15. The speech synthesis system as claimed in claim 10, wherein the pitch of said sound does not change exceeding a prescribed time beyond a prescribed range.

16. The speech synthesis system as claimed in claim 10, wherein said phoneme is a vowel.

17. A speech recognition and synthesis system for recognizing and synthesizing speech in an environment of noise and disturbing sound, which system is provided with an analysis means for analyzing a sound signal including at least one of phonemes and time series of phonemes, and the sound signal further including at least one of noise and disturbing sound, and the system also being provided with a recognition means for recognizing a signal representative of said phonemes and time series of phonemes, wherein the analysis means analyzes the sound signal by performing a frequency analysis and the result of the frequency analysis is treated as a time series in determining if a feature point of the sound signal moves in a prescribed direction in a frequency analysis space relative to a time index axis for a prescribed time period, and wherein the analysis means separates said noise and disturbing sound from said phonemes and time series of phonemes based upon said analyzing and outputs a signal representative of said phonemes and time series of phonemes to the recognition means, and the system also being provided with a synthesis means coupled to said recognition means for synthesizing speech.

18. The speech recognition synthesizing system as claimed in claim 17, wherein analysis results by said analysis means are arranged in the prescribed order individually in the analysis space having a prescribed dimension, and the position of the feature points of said analysis results moves according to a prescribed rule in the time series analysis space composed of said analysis space and the time axis.

19. The speech recognition synthesizing system as claimed in claim 18, wherein said feature point is a point selected from the maximum value and minimum value of said analysis result in said analysis space.

20. The speech recognition synthesizing system as claimed in claim 18, wherein said motion of the position of said feature point in said time series analysis space is a motion in the direction inclined with a prescribed angle to said time axis for a prescribed time or longer.

21. The speech recognition synthesizing system as claimed in claim 18, wherein said motion of the position of said feature point in said time series analysis space is a motion in the direction parallel to said time axis for a prescribed time or linger.

22. The speech recognition synthesizing system as claimed in claim 17, wherein the pitch of said sound does not change exceeding a prescribed time beyond a prescribed range.

23. The speech recognition synthesizing system as claimed in claim 17, wherein said phoneme is a vowel.

24. The speech recognition synthesizing system as claimed in claim 17, wherein said analysis means executes linear convolution operation.

25. The speech recognition synthesizing system as claimed in claim 17, wherein said system is additionally provided with a recognition means including Hidden Markov Model, and said recognition means recognizes the sound which corresponds to said analysis result by said analysis means.

26. A method for separation of speech from noise and other disturbing sound, comprising the steps of:

receiving a sound signal including phonemes and further including at least one of the following, noise and other disturbing sound;

converting the received sound signal to a digital signal, wherein some portions of the digital signal correspond to phonemes and other portions correspond to noise and other disturbing sound; and analyzing the digital signal to distinguish portions of the digital signal which correspond to phonemes from portions of the digital signal which correspond to noise and other disturbing sound;

wherein the step of analyzing includes analyzing the sound signal by performing a frequency analysis and treating the result of the frequency analysis as a time series in determining if a feature point of the sound signal moves in a prescribed direction in a frequency analysis space relative to a time index axis for a prescribed time period; and based upon said analyzing outputting a signal representative of said phonemes; and recognizing said signal representative of said phonemes as speech.

* * * * *

UNITED STATES PATENT AND TRADEMARK OFFICE
CERTIFICATE OF CORRECTION

PATENT NO.: 5,966,690
DATED: October 12, 1999
INVENTOR(S): MASAHIRO FUJITA ET AL It is certified that errors appear in the above-identified patent and that said Letters Patent is hereby corrected as shown below:

Col. 25, line 18, please change "linger" to "longer"
Col. 26, line 7, please change "linger" to "longer"
Col. 26, line 54, please change "linger" to "longer"

Signed and Sealed this

Twelfth Day of December, 2000

Attest:

Q. TODD DICKINSON

Attesting Officer

Director of Patents and Trademarks